(12) United States Patent
Sridhar et al.

(10) Patent No.: US 6,266,701 B1
(45) Date of Patent: *Jul. 24, 2001

(54) APPARATUS AND METHOD FOR IMPROVING THROUGHPUT ON A DATA NETWORK

(75) Inventors: Manickam R. Sridhar, Holliston, MA (US); Sylvain Louchez, Oakville (CA); Malik Z. Khan, Sherborn, MA (US)

(73) Assignee: Sitara Networks, Inc., Waltham, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,869

(22) Filed: Jul. 2, 1997

(51) Int. Cl.[7] .................................................. G06F 15/16
(52) U.S. Cl. ..................... 709/232; 709/227; 709/234; 709/246; 370/465; 370/474; 710/11
(58) Field of Search ................................. 709/227, 228, 709/230, 232, 233, 234, 246; 370/465, 466, 467, 469, 474; 710/11

(56) References Cited

U.S. PATENT DOCUMENTS

| | | | |
|---|---|---|---|
| 5,084,871 | * | 1/1992 | Carn et al. ............................ 370/94.1 |
| 5,224,098 | * | 6/1993 | Bird et al. . |
| 5,303,344 | * | 4/1994 | Yokoyama et al. . |
| 5,452,422 | * | 9/1995 | Okamoto et al. ..................... 395/293 |
| 5,491,693 | * | 2/1996 | Britton et al. . |
| 5,509,121 | * | 4/1996 | Nakata et al. ..................... 395/200.1 |
| 5,515,508 | * | 5/1996 | Pettus et al. . |
| 5,537,417 | * | 7/1996 | Sharma et al. ....................... 370/94.1 |
| 5,557,748 | * | 9/1996 | Norris . |

(List continued on next page.)

FOREIGN PATENT DOCUMENTS 0 613 274    8/1994   (EP) .
0 751 656    1/1997   (EP) .

OTHER PUBLICATIONS

Jacobson and Braden, "TCP Extensions for Long–Delay Paths," Internet Engineering Task Force (IETC), Request for Comments (RFC) #1072, pp. 1–13, 1988.

Jacobson and Braden, "TCP Extensions for High Performance," Internet Engineering Task Force (IETC), Request for Comments (RFC) #1323, pp. 1–31, 1992.

(List continued on next page.)

Primary Examiner—Robert B. Harrell
Assistant Examiner—Stephen Willett
(74) Attorney, Agent, or Firm—Fish & Richardson P.C.

(57) ABSTRACT

A communication system for improving communication over a data network between an application and remote systems where each of the remote systems is configured to communicate using at least one of multiple transport layer communication protocols. The communication system accepts a request from the application to communicate with one of the remote systems, selects a transport layer communication protocols for communicating with the requested remote system, and communicates using the selected transport protocol with the requested system. In addition, the system may select one of multiple network layer communication protocols to communicate with the requested remote system. The application may be configured to communicate using a first of the transport protocols and request to communicate with a remote system using that first protocol, while the selected protocol may be another protocol. Furthermore, in one feature, the selected transport layer protocol supports selective retransmission while the requested protocol does not support selective retransmission. In another feature, the selected communication protocol supports transmission rate control while the requested protocol does not support transmission rate control.

50 Claims, 13 Drawing Sheets

U.S. PATENT DOCUMENTS 5,588,121 * 12/1996 Reddin et al. .
5,640,394 * 6/1997 Schrier et al. .
5,706,434 * 1/1998 Kremen et al. .
5,787,248 * 7/1998 Zupcsics et al. .................. 395/200.6
5,801,942 * 9/1998 Nixon et al. .
5,918,016 * 6/1999 Brewer et al. ....................... 709/220

OTHER PUBLICATIONS

"Xpress Transport Protocol Specification," XTP revision 4.0 manual, XTP Forum, Santa Barbara, CA, 1995.

Microsoft, "Windows Sockets 2 Application Programming Interface," revision 2.1.0., chapters 1–2, manual, 1996.

* cited by examiner

APPARATUS AND METHOD FOR IMPROVING THROUGHPUT ON A DATA NETWORK

BACKGROUND OF THE INVENTION

This invention relates to communication through a data network, and in particular relates to improving communication characteristics, including throughput, between computers coupled to the network.

The Internet has become an almost ubiquitous tool for accessing and retrieving information, and for conducting business in general. Accessing and displaying distributed linked multimedia documents on the Internet, known as browsing pages on the World Wide Web (the "Web"), has become an essential part of information retrieval for both business and pleasure. The Internet has brought previously hard to find information to everyone's fingertips. Devices such as commerce servers are now enabling business transactions to be conducted through the Internet. Due in part to the convenience of obtaining information and carrying out commercial transactions, people are joining the Internet community at a very rapid pace. This explosive growth of the number of users and the popularity of the available services has put a strain on the network which has become congested. This congestion has lead to users experiencing undue delays while trying to retrieve information and communicate through the network. The congestion also leads to the Internet behaving inconsistently. One can experience almost instantaneous response at certain times of the day, while it may appear to be impossible to reach the same server at other times of the day. Long delays and inconsistency diminish the user experience and may result in lost business opportunities.

Referring to FIG. 1, client and server computers C1–C9, S1–S4 (that is, computers executing the client and server applications) are coupled to the Internet 100. The Internet itself includes high speed ("backbone") data connections typically operating at data rates in the range of 45 Mb/s (e.g., T3 capacity telephone trunks) or higher connected by switches or routers that forward packets towards their destinations. Computers C1–C9, S1–S4 are connected to the Internet through network Points of Presence (POPs) 10a–110d. A POP typically includes routers 112a–112d that is coupled to the Internet through data connections 114a–114d with capacity typically in the range of 1.5 Mb/s (e.g., a T1 capacity telephone connection) to 45 Mb/s (T3 capacity). Client computers can connect to a POP in a variety of ways, including those described below.

Client computers C1–C3 connect directly to a POP 110a over slow-speed, telephone modem connections 121–123 communicating a data rates in the range of 28 kb/s to 56 kb/s.

Clients computers C4–C6 are connected to each other within a single location using a local area network (LAN) 130 and a single computer or router serves as a gateway device 132. This gateway may serve a variety of functions, including packet routing, packet filtering (a security firewall), and various types of proxy service. The connection 124 between gateway device 132 and POP 110a is then similar to that of the individual clients, although the data rate is typically higher, for example, in the range of 128 kb/s (e.g., an ISDN telephone connection) to serve the requirements of the multiple clients.

Client computers C7–C9 connect directly to a POP 10b, but access a gateway device 140 at the POP that acts as a proxy server coupling the clients to a router 112b and then to the Internet. The connections 127–129 between the clients and the POP are typically a slow-speed telephone modem connection. The connection between the client and the proxy server may use standard protocols or may use a proprietary protocol not generally used elsewhere in the Internet.

Servers S1–S4 are also connected to POPs 110c–110d, although the communication capacity between a server site and a POP is typically 1.5 Mb/s or higher. At the server sites, local area networks 150, 152 with a capacity of 10 Mb/s or higher couple multiple servers and routers 154, 156 that are used to communicate with the POPs.

Internet communication is based on a layered model of communication protocols consistent with that published by the International Standards Organization (ISO) as shown in FIG. 2. The set of ISO protocol layers, or protocol stack, is numbered from one, at the lowest layer, to seven, at the application layer.

Communication over the Internet is based on packet-switching techniques. Addressing and transport of individual packets within the Internet is handled by the Internet Protocol (IP) corresponding to layer three, the network layer, of the ISO protocol stack. This layer provides a means for sending data packets from one host to another based on a uniform addressing plan where individual computers have unique host numbers and each computer has a logical set of numbered ports that can be individually addressed. By making use of the IP layer, a sending computer is relieved of the task of finding a route to the destination host. However, packets may be lost or damaged and are not guaranteed to be delivered in the order sent. Therefore, the sending host needs to make sure that the data sent is successfully received and that a series of individual packets is assembled appropriately.

A common denominator for the Internet is the "everything over IP" paradigm. There are protocol variations above layer three, for example, various application and transport protocols, and below layer three, for example, various communication paths making up the network infrastructure, but layer three does not change. This allows IP to be the sole routing scheme in the Internet thereby enabling the worldwide connectivity which is a major ingredient of its success.

A transport layer protocol provides end-to-end communication between applications executing on different computers and regulates the flow of information between those applications. Rate and flow control are two examples of regulations of the flow of information. A transport layer protocol may also provide reliable transportation of information including, for example, in-sequence delivery of information and retransmission of lost or damaged information. Today, the Transmission Control Protocol (TCP) is used almost exclusively to provide end-to-end reliable (i.e., error free) data streams between computers over the Internet. TCP is layered on the IP protocol and corresponds to the ISO layer four transport layer.

Software supporting use of the TCP protocol is provided on most popular operating systems, such as Microsoft Windows 95 and Windows NT, and most variants of Unix. An application using TCP is relieved of the details of creating or maintaining a reliable stream to a remote application and simply requests that a TCP-based stream be established between itself and a specified remote system.

As a result of TCP being essentially universally accepted as the transport protocol, various client server applications have evolved which layer application-specific protocols on top of end-to-end TCP communication channels, which are in turn layered on the IP network layer. Application layer protocols for file transfer, FTP (file transfer protocol), and for Web page access, HTTP (hypertext transfer protocol), are two examples of popular application protocols layered on TCP.

The World Wide Web implements a system in which client applications, e.g., browsers such as Netscape Navigator or Microsoft Internet Explorer, can access and display linked documents, called Web pages, through server applications using the application layer hyper-text transfer protocol, HTTP. An address of a Web page or related data, referred to as a URL (uniform resource locator), typically includes a server host name and a symbolic reference to the data. The browser typically establishes a TCP-based connection to a predetermined port on the server host. That port is monitored by the server process. The client and the server communicate using the HTTP protocol over one or more TCP connections. Today, HTTP version 1.0 is commonly used.

A Web page typically includes references (URLs) to other files that must also be retrieved in order to complete the rendering of the originally requested page. A browser interprets incoming data from a server, determines the URL of other files that are needed, and establishes concurrent TCP connections to retrieve those subordinate files as well. The subordinate files do not necessarily come from the same server, but in practice, this is very often the case. For example, a scanned image included on a Web page will in general be included in that page as a reference to a separate file on the same server. Such a scanned image file is retrieved over its own TCP connection.

TCP based communication can use an end-to-end sliding window protocol where many packets of data can be sent before requiring that data in the first packet is acknowledged by the receiver. If one packet is lost or damaged, the sender determines after a time-out period that the packet needs retransmission and the entire sequence must be restarted at the un-acknowledged packet in a "Go-Back-N" paradigm. The timeout period must be significantly greater than a typical round-trip time from one host to the other and back to avoid premature timeouts. All the packets sent after the lost or damaged packet are sent again. Since most of the packets sent after the lost or damaged packet have likely been successfully received, this error recovery procedure results in unnecessary use of communication capacity. There is no means for the receiver to simply request the missing packet using TCP. A very small window is generally used on channels with high rates of packet loss or error. A small window can result in low throughput.

FIG. 3 shows an exemplary sequence of data transfers between a representative client computer C1 and a representative server computer S1 using an end-to-end TCP channel over a communication path which is transported through POPs 110a and 110c and through the Internet 100, as shown in FIG. 1. Client computer C1 is represented in FIG. 3 by vertical line 302 and server computer S1 by vertical line 304. Time flows from top to bottom and each arrow represents a data packet traveling across the communication channel. For illustration, we assume that TCP is operating with a sliding window size of four packets. The client sends a request R1 to the server who sends back acknowledgment AR1. The server then sends a sequence of data packets D1–D4 and then must wait for an acknowledgment to D1 before proceeding. In this example, we assume that the server can immediately start sending data as soon as it has receive the request. Acknowledgments AD1 and AD2 are received by the server who proceeds to send data packets D5 and D6. For illustration, the sixth packet D6 is lost near the midpoint of the communication path. Data packets D7–D9 are transmitted after acknowledgments AD3–AD5 are received. The server now waits to receive acknowledgment for the lost sixth packet D6. After a time-out period 310, the server retransmits the sixth packet D6' and then continues in sequence with the retransmissions D7'–D9'.

Referring to FIG. 4, using HTTP to retrieve data for a Web page which includes embedded references to other data requires several TCP exchanges. FIG. 4 shows the sequence of data transfers (without showing the acknowledgments) in which client computer Cl, represented by vertical line 402 requests and receives a Web page from server computer S1, represented by vertical line 404. No transmission errors are illustrated in this case. Acknowledgments are not shown. Client computer C1 sends a request G1 to server computer S1. Server computer S1 responds with Web page P1. The client computer parses page P1 and determines that it needs two additional documents and issues requests G2 and G3. Server computer S1 receives the requests and sends data P2 and P3 concurrently to the client computer.

FIG. 5 shows an exemplary sequence of data transfers between a representative client computer C4 that is serviced by a proxy application, hosted on a gateway computer 132, and a representative server computer S1 (FIG. 1). Client computer C4 is represented by vertical line 502, gateway computer 132 is represented by vertical line 504, and server computer S1 is represented by vertical line 506. Separate TCP channels are established between client computer C4 and gateway computer 132 and between the gateway computer and server computer S1. Communication between the client computer and the gateway computer uses TCP but encapsulates application-specific requests and responses in a proxy protocol. The proxy application strips the proxy protocol from outbound packets and forwards them to the intended recipient. The proxy application therefore acts as a server from the point of view of the client application and acts as a client from the point of view of the server application. Inbound packets are received by the proxy application, wrapped with the proxy protocol and forwarded to client application. Client computer C4 sends a request G11 to gateway computer 132. Gateway computer 132 forwards the request as G12 to server computer S1. Server computer S1 responds with Web page P11 which is forwarded by gateway computer 132 to client computer C4 as P12. The client computer parses page P12 and determines that it needs two additional documents and issues requests G21 and G31 which are forwarded to server computer SI as G22 and G32 by gateway computer 132. Server computer S1 receives the requests and sends the requested data concurrently to the gateway computer as P21 and P31. The gateway computer forward the data to the client computer as P22 and P32.

Referring to FIG. 1, a proxy application serving the same function as that hosted on gateway computer 132 described above can be hosted on proxy server 140. In this case, a sequence of data transfers between a representative client computer C7 that is serviced by a proxy server 140 at POP site 10b and a representative server S1 follows the same pattern as shown in FIG. 5. Although the sequence of transfers is the same, in the previous case the data rate between the client application and the proxy application is high and the connection between the proxy application and the Internet is slow, while in this case, the connection between the client application and the proxy application is slow and the connection between the proxy application and the Internet is high.

SUMMARY OF THE INVENTION

In general, embodiments of this invention provide desirable communication characteristics, such as reduced latency and higher throughput, between applications, such as a client Web browser and a Web server, connected through a data network such as the Internet.

In an aspect the invention, alternative transport or application layer protocols are used, rather than the protocols used by the applications, on all or a portion of the communication path joining two applications. Features of the alternative protocols can include one or more of selective retransmission of lost or damaged packets, multiplexing of multiple data streams over a single connection, and separate rate control and flow control methods. These or other features of the alternative protocol can improve throughput and reduce latency over those achieved using the protocols such as TCP or HTTP on the entire path joining the applications. Selective retransmission incurs relatively low overhead and delay on a channel with high error rates, while still allowing use of a large sliding window. Multiplexing multiple data streams may reduce the overhead, and thereby reduce latency, in establishing new connections. Rate control may reduce congestion at points on a communication path that data rates are reduced, thereby reducing packet loss due to overfilling buffers.

In another aspect of the invention, communication from an application selectively uses the alternative protocol for communicating with applications that support that protocol and uses the original protocol for those that do not.

In another aspect of the invention, requests from a client application are anticipated and transmission of data from a server application is begun prior to the client application explicitly making a request for the data.

In general, in one aspect, the invention is a communication system for improving communication over a data network between an application and remote systems where each of the remote systems is configured to communicate using at least one of multiple transport layer communication protocols. The application may be a client application or a server application, and a remote system may include multiple computers such as, but not limited to, a client computer, a server computer, a gateway computer, a proxy server, or a remote communication server. The communication systems includes means for accepting a request from the application to communicate with one of the remote systems, selecting a transport layer communication protocol for communicating with the requested remote system, implementing the selected transport protocol, and communicating using the selected transport protocol with the requested system.

Preferred embodiments of the invention may include one or more of the following features. The system may include a means for selecting one of multiple network layer communication protocols to communicate with the requested remote system, a means for implementing a selected network protocol, or a means for communicating using a selected network protocol with a requested system. The system may include a means for determining one or more acceptable protocols using which the requested remote system is able to communicate, and the means for selecting one of the protocols then selects one of the acceptable protocols.

The application may be configured to communicate using a first of the transport layer communication protocols, a request to communicate with a remote system includes a request to communicate using the first protocol, and the selected protocol is other than the first protocol. Furthermore, in one feature, the selected communication protocol supports selective retransmission while the first protocol does not support selective retransmission. In another feature, the selected communication protocol supports transmission rate control while the first protocol does not support transmission rate control.

The system may include a multiplexor used to multiplex information received from the application into a single outbound data stream for transmission to the remote system, and include a demultiplexor used to demultiplex information received from the remote system as a single inbound data stream for transfer to the application. The system may also include a buffer used to hold information received from the remote system prior to receiving a request for the information for the local application. Furthermore, the system may include a means for interpreting a request for information from the application and a means for determining if the requested information is stored in the buffer.

The system may include a means for interpreting information received from the application and, using the result, for requesting additional information. The system may also include the feature that the application is configured to communicate using a first of the plurality of transport layer communication protocols, the request to communicate with the remote system includes a request to communicate using the first protocol, the remote system is configured to communicate using both the first protocol and a second of the plurality of protocols, and the selected protocol is the second protocol.

In general, in a second aspect, the invention provides a method for improving communication over a data network between an application and multiple remote systems, each configured to communicate using at least one of multiple transport layer communication protocols. The method includes the steps of accepting a request to communicate with one of the remote systems, selecting one of the transport layer communication protocols for communicating with the requested remote system, implementing the selected transport protocol, and communicating using the selected transport protocol with the requested system.

In general, in a third aspect, the invention provides software, stored on a computer-readable medium, which includes instructions for causing a computer to perform the functions of accepting a request to communicate with one of multiple remote systems, selecting one of a multiple transport layer communication protocols for communicating with the requested remote system, implementing the selected transport protocol, and communicating using the selected transport protocol with the requested system. In various embodiments, the software may execute on computers, including a computer on which the application also executes, on a gateway computer on which a proxy application executes, on a remote communication server, on a computer that is part of the remote system, or on some other computer.

Advantages provided by embodiments of this invention include higher throughput and lower latency between applications communicating over a data network. These advantages can be achieved without requiring that client, server, or proxy applications be modified, and without requiring any modification of the data network itself. In addition, since throughput is increased and the therefore the time required to satisfy a request is reduced, a larger number of clients can be serviced by a server computer without requiring additional concurrent communication ports.

DESCRIPTION OF THE PREFERRED EMBODIMENTS

Embodiments of this invention involve communication between a client application and a server application over a data network, such as the Internet. An example of such communication is between a client application which is a Web browser and a server application which is a Web server, although other types of client and server applications can be involved as well. Furthermore, although one application is referred to as the "client" and one as the "server," embodiments of this invention are applicable to many situations when one application communicates with another over a data network and neither is exclusively a client or a server.

In the description that follows, a client application executes on a client computer which is coupled to the data network and a server application executes on a server computer also coupled to the data network. A server site includes one or more server computers on which server applications can execute, and in some embodiments of the invention, the server site also includes an additional computer used for communication between a client application and a server application executing at the server site. From the point of view of a client application, the combination of several computers at a server site can be viewed as a "server system" providing services to the client application.

Several embodiments of the invention substantially share common functionality implemented in software modules executing on various computers, including client and server computers as well as other computers, such as gateway computers, used for communicating between client and server computers. In a first embodiment of the invention, software modules which implement the common functionality are hosted on computers other than client or server computers which host communicating client and server applications. In a second embodiment software modules which implement common functionality are hosted on the client and server computers themselves. Other embodiments use various combinations of computers to host software modules.

Figure 6:
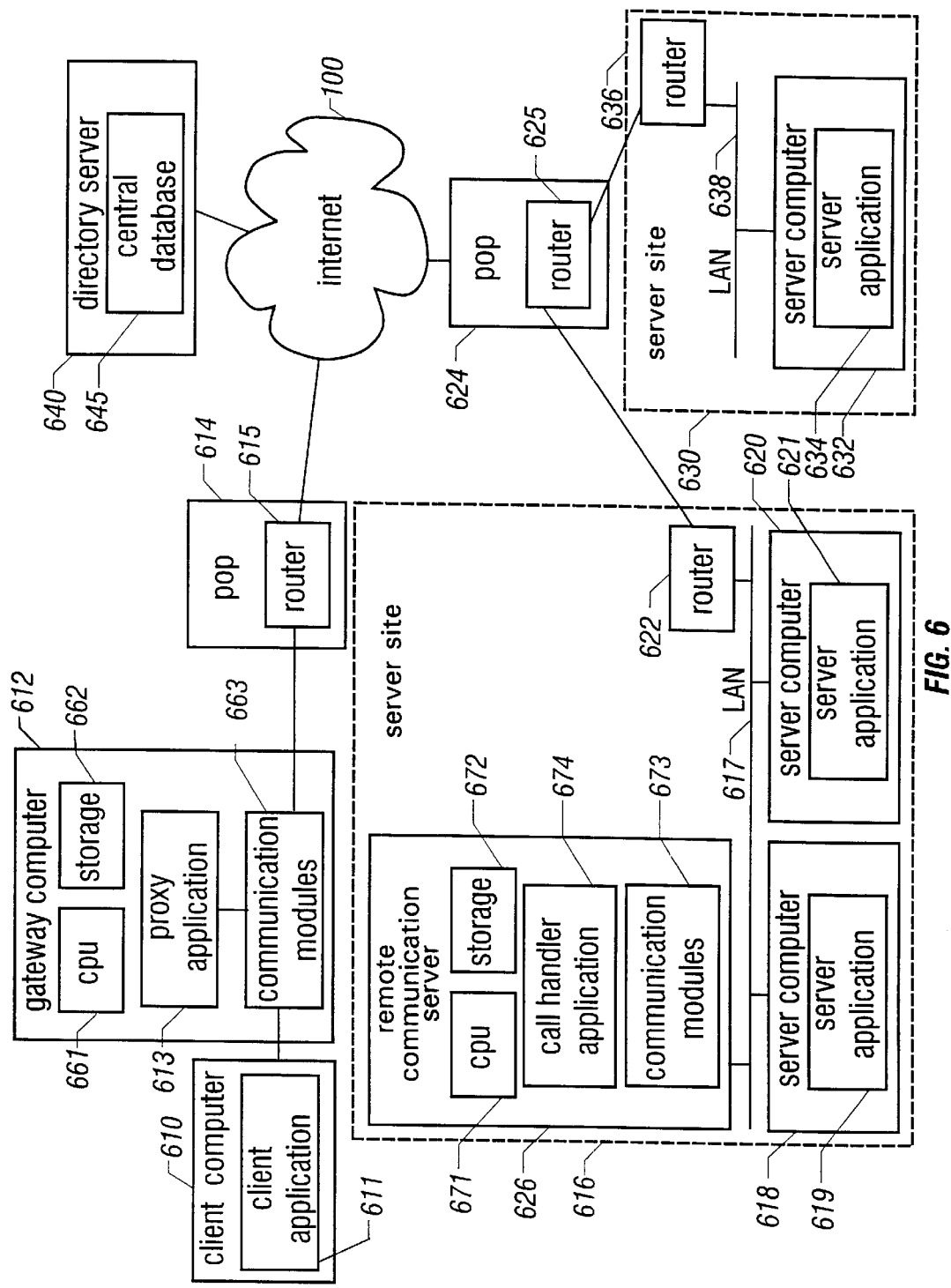
FIG. 6 illustrates a client computer and server computers coupled to the Internet and shows a gateway computer and a remote communication server used for communication between the client computer and certain server computers.

Referring to FIG. 6, a first illustrative embodiment of the invention supports communication between an exemplary client application 611 executing on a client computer 610 and exemplary server applications 619, 621, 634 executing on server computers 618, 620, 632 at server sites 616, 630. All the computers are coupled to Internet 100, which uses the Internet Protocol (IP) for network layer (ISO layer 3) communication. Client application 611 and server application 619,621,634 are configured to use TCP.

Client application 611 executing on client computer 610 communicates over the Internet with server computers 618, 620, 632 through a gateway computer 612 that in turn communicates with Internet 100 through POP 614. A proxy application 613 executes on gateway computer 612. Client application 611 is configured such that when it needs to establish a communication channel to a server computer, it contacts proxy application 613 with a request to establish that communication path. Once the communication channel is established further communication between client application 611 and the server computer passes through gateway computer 612 and is handled by proxy application 613. From the point of view of a server computer, it appears that an application on gateway computer 612 rather than an application on client computer 610 is requesting services. For example, the address of the client computer is generally not known by a remote server. Proxy application 613 can in general handle multiple communication channels between one or more client applications and one or more remote servers.

Two server sites 616, 630 include servers 618, 620 at server site 616 and server 632 at server site 630 coupled to LANs 617 and 638 respectively. Routers 622 and 636 are coupled to LANs 617 and 638 respectively and provide access through POP 624 to Internet 100. Server applications 619, 621, 634 are hosted on server computers 618, 620, 632 respectively. Server site 616 is specially configured in that it also includes a remote communication server 626 also In coupled to LAN 617. Remote communication server 626 is used to pass certain communication between router 622 and server computers 618, 620. Normally configured site 630 does not include a remote communication server.

In this first embodiment, communication between client application 611 hosted on client computer 610 and server application 619 hosted on server computer 618 at specially configured server site 616 can use two different communication paths. A first communication path is made up of two TCP-based segments in series, one between client computer 610 and gateway computer 612 executing a proxy application 613, and one between gateway computer 612 and server computer 618. The path followed by the second segment passes from gateway computer 612 to router 615 at POP 614, through various communication links and routers in Internet 100, then to router 625 at POP 624, to router 622 on LAN 617 at server site 616, and finally to server computer 618.

Communication on the first segment between client computer 610 and gateway computer 612 uses TCP as the transport protocol. At the application layer, on the first segment, client application 611 communicates with proxy application 613 using a proxy protocol that incorporates application protocols used for the end-to-end application layer communication between the client application and the server application. On the second segment, proxy application 613 communicates with server application 619 using the appropriate application layer protocol for which the server application is configured. Two specific application protocols that are used to communicate between client application 611 and server applications are HTTP for accessing Web pages and data embedded in Web pages and FTP for accessing remotely stored files.

A second communication path between client application 611 on client computer 610 and server application 619 hosted on server computer 618 at specially configured server site 616 uses remote communication server 626 to forward communication. Rather than communicating directly with server computer 618, gateway computer 612 communicates with remote communication server 626 which in turn communicates with server computer 618, thereby creating three separate segments on the path joining client computer 610 and server computer 618. The first segment is a direct path between client computer 610 and gateway computer 612. The second segment follows the path from gateway computer 612 to router 615 at POP 614, through various communication links and routers in Internet 100, then to router 625 at POP 624, to router 622 on LAN 617 at server site 616, and finally to remote communication server 626. The third segment is a direct path over LAN 617 between remote communication server 626 and server computer 618.

Communication on the first segment, from client computer 610 to gateway computer 612, uses the same protocols as on the same segment in the first communication path described above. Communication on the second segment joining gateway computer 612 and remote communication server 626, rather than using TCP, uses XTP, an alternate transport layer protocol. Furthermore, when client application 611 and server application 619 are both using the HTTP application layer protocol, a data stream corresponding to that HTTP communication uses a modified HTTP protocol. Communication over the third segment from remote communication server 626 to server computer 618 uses TCP and standard application layer protocols including HTTP.

On the second communication path from client computer 610 to server computer 618 there are three segments at a transport layer (ISO layer 4). At the application layer (ISO layer 7) the communication path is made up of either one logical segment or three logical segments. When HTTP is not used, there is one logical segment joining the client and server application. That is, a sequence of data bytes sent by the client application are transported to the server application unmodified. When HTTP is used, there are three logical segments at the application layer. The first segment and the third segment use HTTP, while the second segment uses a modified HTTP protocol. Furthermore, a sequence of data bytes sent according the HTTP protocol from client application 611 is not necessarily delivered to server application 619. HTTP data streams received at gateway computer 612 and at remote communication server 626 are interpreted and are not necessarily passed on without modification. Gateway computer 612 and remote communication server 626 cooperate to provide the needed translation into appropriate protocols for communicating with the client and server computers.

As there is no remote communication server at normally configured site 630, communication between client application 611 at client computer 610 and server application 634 at server computer 632 at the normally configured site 630 must use a two-segment TCP-based communication path. The first segment is between client computer 610 and gateway computer 612 executing proxy application 613, and the second is between gateway computer 612 and server computer 632. The second segment passes from gateway computer 612 to router 615 at POP 614, through various communication links and routers in Internet 100, then to router 625 at POP 624, to router 636 on LAN 638 at server site 630, and finally to server computer 632. Gateway computer 612 can concurrently support communication with both specially-configured server sites and normally-configured server sites.

When client application 611 communicates with a server application, such as server application 619 or server application 634, gateway computer 612 determines whether a data path through a remote communication server can be established, or whether a direct path to a server computer must be used. A path through a remote communication server is preferred since such a path can use the alternative transport and application layer protocols described above, which results in higher data throughput and lower latency than when using a direct path between gateway computer 612 and a server computer.

Gateway computer 612 includes CPU 661 and storage 662, such as a magnetic disk drive. Software stored in storage 662, when executed on CPU 661, includes proxy application 613 and communication modules 663. Communication modules 663 provide an interface for proxy application 613 to communicate with client application 611 and with server applications at the server sites coupled to Internet 100.

Remote communication server 626 includes CPU 671 and storage 672. Software stored in storage 672, when executed on CPU 671, includes call handler application 674 and communication modules 673. Communication modules 673 provide an interface for call handler application 674 to communicate with server applications 619 and 621 and proxy application 613.

A central database 645 is hosted on a directory server 640 also coupled to Internet 100. Database 645 includes information which may be used to identify a remote communication server which is configured to communicate with a particular server computer. This database may be used by gateway computer 612 to determine whether a request to communicate with a server computer can be satisfied by establishing a communication path through a remote communication server. Each entry in the database 645 associates an address of a server application, with certain information needed to set up an indirect path to that server application through a remote communication server. An address of a server application includes a host address and port index of a port listened to by that server application. Information needed to set up an indirect path includes the host address and port index used to connect to an appropriate remote communication server. In addition, the database may be used to indicate that a particular application layer protocol is used by the server application at a particular server application address.

In this first embodiment, as introduced above, the transport (ISO layer 4) protocol used between gateway computer 612 and remote communication server 626 is based on the express Transport Protocol (XTP). XTP is layered on the IP network protocol (ISO layer 3) which is used to route packets which make up the XTP communication between gateway computer 612 and remote communication server 626.

XTP has several characteristics that differ from TCP and that give it advantages over TCP. One characteristic of XTP is that it supports use of a sliding window in combination with selective retransmission of lost or damaged packets. This combination allows efficient streaming of data over the XTP based segment joining gateway computer 612 and remote communication server 626.

Figure 7:
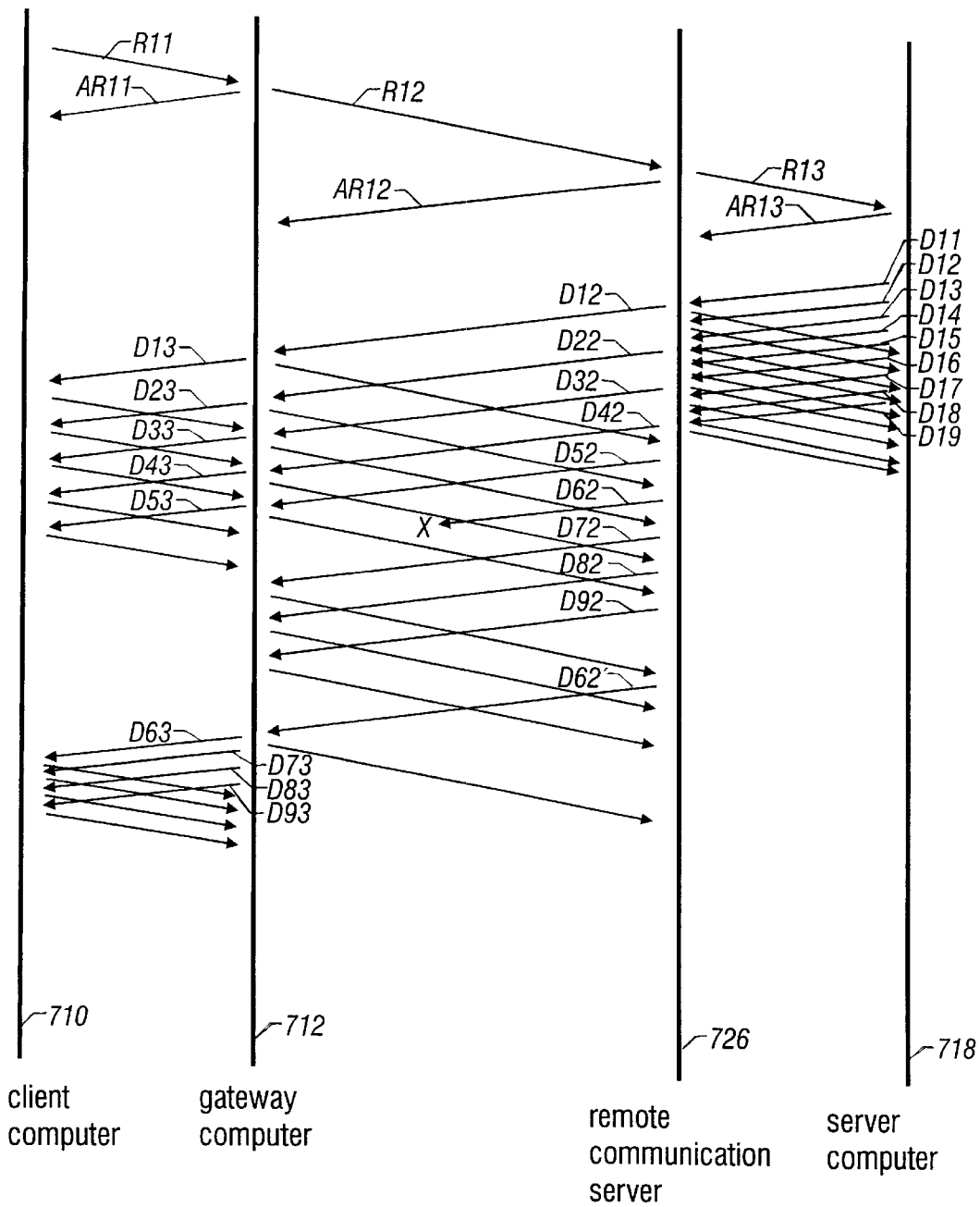
FIG. 7 shows an exemplary sequence of data transfers between a client computer and a server computer through a gateway computer and a remote communication server.

FIG. 7 illustrates an exemplary sequence of data transfers involved in sending a request and receiving a multipacket reply along a communication path (FIG. 6) from client computer 610 through gateway computer 612 and remote communication server 626 and finally to server computer 618. For illustration, vertical lines 710, 712, 726, 718 in FIG. 7 represent client computer 610, gateway computer 612, remote communication server 626 and server computer 618, respectively, and diagonal lines illustrate data and acknowledgment packets that pass between the computers along the communication path. As described above, TCP is used on the first segment between client computer 610 and gateway computer 612 as well as on the third segment from remote communication server 626 and server computer 618. XTP is used on the second segment from gateway computer 612 to remote communication server 626. In this illustration, both the first and third, TCP, segments and the second, XTP, segment operate with a sliding window sizes of four packets and each packet is explicitly acknowledged.

Figure 3:
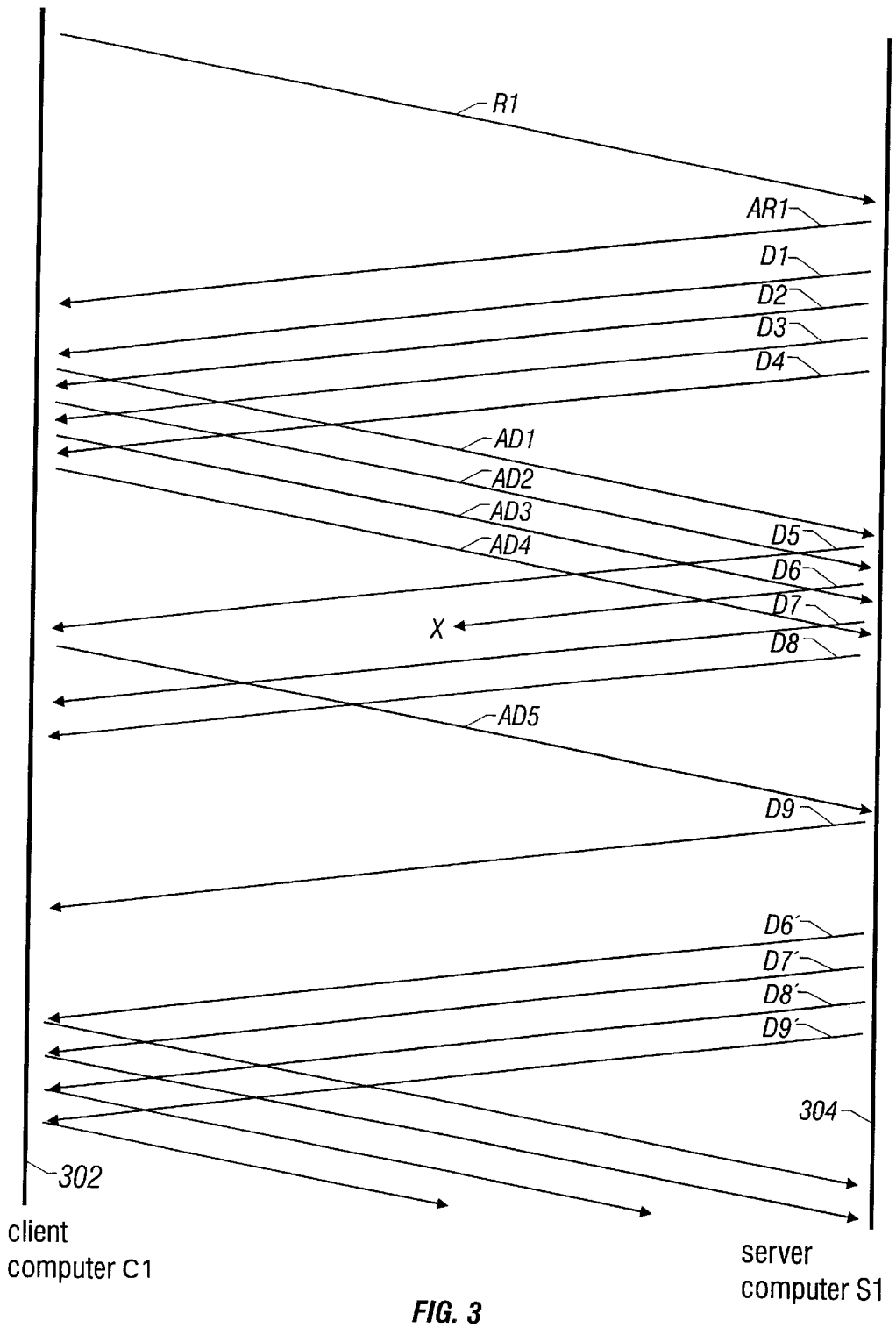
FIG. 3 shows an exemplary sequence of data transfers between a client computer and a server computer using TCP.

A request R11 from client computer 610 is forwarded by gateway computer 612 as R12, and then forwarded by remote communication server 626 as R13. Acknowledgments AR11, AR12, AR13 are sent by gateway computer 612, remote communication server 626 and server compute 618, respectively, when the corresponding request packets are received. After acknowledging receipt of request R13, server computer 618 immediately begins sending data D11–D19. Remote communication server 626 has a large buffer for data packets and quickly accepts and acknowledges all the data packets from server 618. When remote communication server 626 receives the first data packet D11, it begins sending data D12 to gateway computer 612. This continues with data packets D22–D92. In this example, it is assumed that data packet D62 is lost at a point between the server computer and the client computer and is never acknowledged. Once the remote communication server determines that the packet is lost, either by a time-out or by an explicit negative acknowledgment (NACK), the remote communication server retransmits that packet as D62'. Note that since the remote communication server has buffered the data and therefore does not have to request retransmission of the sixth packet from server 618. The gateway computer forwards data packets D12–D52 to client computer 610 as packets D13–D53 but waits for successful receipt of the sixth data packet D62' until it can deliver packets D63–D93 in the correct order to the client computer. FIG. 7 should be contrasted with FIG. 3 which illustrates a similar request, and reply on a single TCP connection. In FIG. 3, in addition to retransmitting the sixth packet, the seventh through ninth must be retransmitted as well. Also, since there is only one TCP segment, packet retransmissions must pass over the entire path from the server computer to the client computer and not simply over a portion of the path.

Other transport layer protocol characteristics in the XTP segment joining gateway computer 612 and remote communication server 626 include explicit rate control, which avoids congestion along a communication path, and multiplexing of multiple logical data streams between computers, which provides more efficient data transfer. Note that TCP does not have a similar explicit mechanism for rate control, and uses a separate instance of the TCP protocol for each logical data stream. As described more fully below, each of these characteristics yields performance advantages over using TCP.

With explicit rate control one can limit the rate at which data is sent along a communication path based on knowledge of the ability of the data path to transfer data. Referring to FIG. 6, consider the data path from remote communication server 626 and gateway computer 612. Along this path, data links of widely varying data rates are traversed. A 128 kb/s link joins gateway computer 612 and POP 614 while a 10 Mb/s link joins remote communication server 626 to router 622. If remote communication server 626 sends data significantly faster than can be passed over the 128 kb/s link from POP 614 to gateway computer 612, that data will have to be buffered somewhere along the path. This results in various inefficiencies including possible loss of a packet due to an overfull buffer, for example, a buffer at POP 614. Such a lost packet would only be discovered at the other end of the transport layer data stream, namely, at gateway computer 612 in this case. The lost data would then have to be retransmitted over the entire path. Rate control is used to limit the rate at which remote communication server 626 sends data to avoid this problem. In this case, the allowable rate of transmission from remote communication server 626 would not be significantly higher than the 128 kb/s that can be sustained on the link from POP 614 to gateway computer 612.

Multiplexing enables one to use a single instance of the XTP protocol executing for a pair of computers communicating using XTP to handle multiple logical data streams between the two computers. This multiplexing capability is in contrast to TCP in which a separate instance of the TCP protocol executes independently for each logical data stream. An example of a situation in which multiple data streams are passing concurrently between two computers is when a Web browser requests data to render a particular Web page. If there are embedded references to other data in a Web page, separate TCP data streams, each with a separate instance of the TCP protocol, are used to retrieve the referenced data. Using XTP, if the data is retrieved from the same computer, the multiple data streams are multiplexed and use only a single instance of the protocol.

Bidirectional data communication using XTP enables one to implicitly open a reverse data channel when a forward data channel is open. This is in contrast to TCP in which a reverse data channel must be set up using the same sequence of exchanges that are required to set up the forward data channel.

The previously mentioned modified HTTP protocol is used when a client application and a server application communicate using the HTTP protocol over an indirect communication path through a remote communication server. The modified HTTP protocol maintains the format of underlying data transported over HTTP (such as html formatted Web pages). In a first aspect of the modified HTTP protocol, multiple HTTP data streams between the client and the server are multiplexed on a single logical XTP data stream over the segment joining the remote communication server and the gateway computer. Note that multiplexing of multiple HTTP data streams onto one logical XTP data stream is different from and in addition to XTP itself multiplexing multiple logical data streams between a pair of computers for transmission using a single instance of the XTP protocol. Moreover, as is described further below, not all commands or data pass across the entire path from client application 611 to server application 619. For example, some client application commands send from the client application to the proxy application may be handled on the gateway computer and may not require services of the remote communication server or the server computer.

A second aspect of the modified HTTP protocol is that data is prefetched from server computers 618,621 by remote communication server 626 and is sent to the gateway computer 612 in anticipation of client application 611 making an explicit request for the data. The data is buffered at gateway computer 612 until it is requested by the client application. Remote communication server 626 determines what data to prefetch based on references embedded in html format Web pages that are transferred from server computer 618 or 621 through the remote communication server to the client application.

Figure 4:
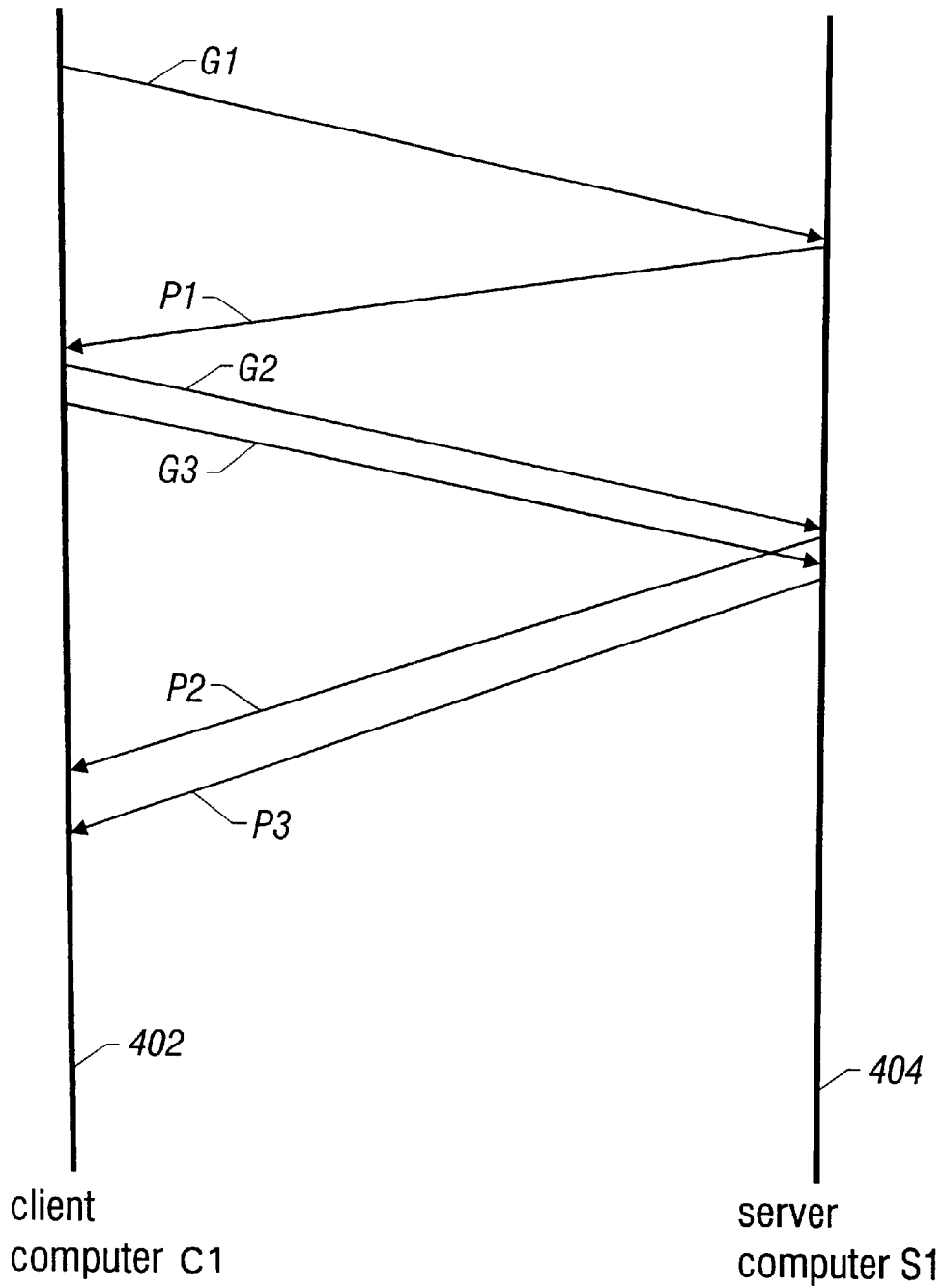
FIG. 4 shows an exemplary sequence of data transfers between a client computer and a server computer using HTTP.
Figure 5:
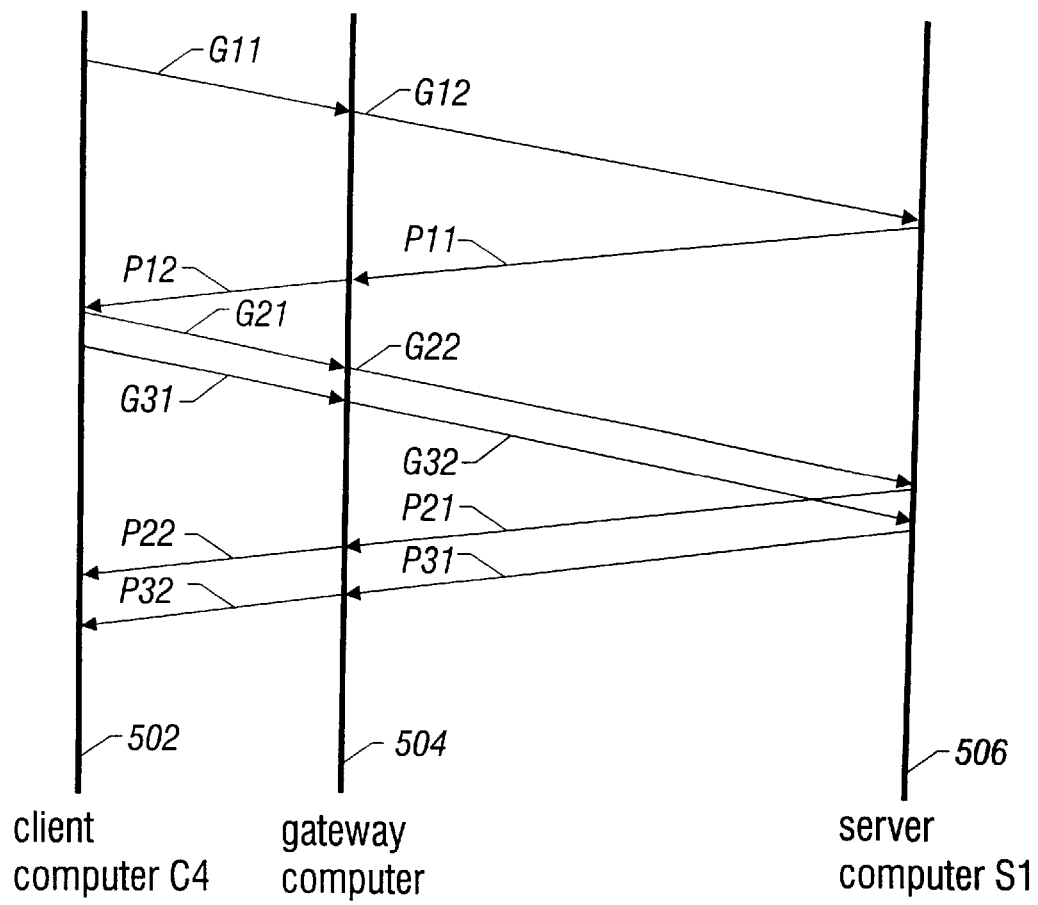
FIG. 5 shows an exemplary sequence of data transfers between a client computer and a server computer communicating through a gateway computer using TCP.
Figure 8:
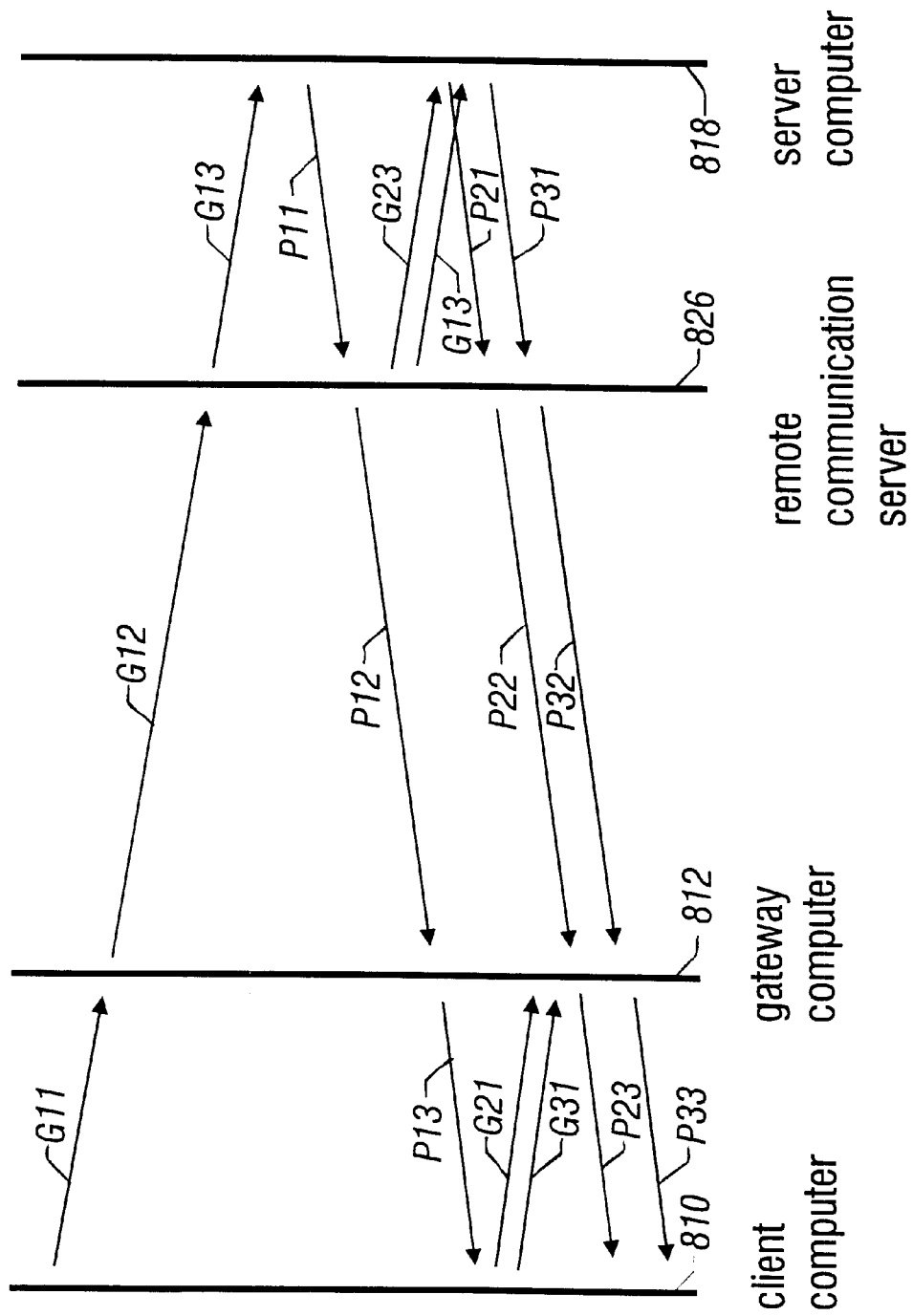
FIG. 8 shows an exemplary sequence of data transfers between a client computer and a server computer using a modified HTTP protocol.

FIG. 8 illustrates operation of the modified HTTP protocol which involves coordinated operation at the remote communication server and the gateway computer. This should be contrasted to a similar exchange using an end-to-end HTTP based connection shown in FIG. 4. Client computer 610, gateway computer 612, remote communication server 626, and server computer 618 (FIG. 6) are illustrated as vertical lines 810, 812, 826, 818, respectively, in FIG. 8. Transmission of Web page and other object requests and responses are shown as arrows with time increasing from top to bottom in the figure. Acknowledgments are not illustrated. Client computer 610 sends an initial "GET" request G11 for a Web page. Gateway computer 612 forwards the request from the client computer to remote communication server 626 as request G12. Remote communication server 626 receives G12 and requests the Web page from Web server 618 using a standard HTTP request G13. Web server 618 sends the requested page P11 to the remote communication server. Remote communication server 626 sends as page P12 to gateway computer 612, which in turn sends page P13 to client computer 610.

Remote communication server 626, in addition to forwarding page P11 received from server computer 618 to gateway computer 612 as page P12, interprets page P11 if it is in html format. Page P11 is parsed by an html parser and two embedded references to images or other objects found on that page are extracted. For illustration, two references in the received page P11 result in remote communication server 626 sending requests G23 and G33 to server computer 618. The server computer responds with data P21 and P31 which are, in turn, forwarded by the remote communication server to gateway computer 612 as P22 and P32. When this data is received by the gateway computer, it is buffered since client computer has not yet requested the data. The data is effectively "prefetched" in anticipation of client application 611 on client computer 610 requesting that data. When gateway computer receives page P12 from remote communication server 626, it forwards that page as P13 to the client computer where it is interpreted by the client application that made the ordinal request G11. The client application makes requests G21 and G22 for the same data already requested by remote communication server 626 in requests G23 and G33. Gateway computer 612 does not forward the requests G21 and G31 since the data P22 and P32 which satisfies these requests has already been received and buffered by the gateway computer. The gateway computer passes the buffered data to the client computer. From the client computer's perspective, the fact that the data was prefetched is not evident other than in that the requests are satisfied with less delay than might be expected if requests G21 and G31 had been forwarded all the way to server computer 618 before being serviced.

There are two situations in which remote communication server 626 anticipates a request from client computer 610 and retrieves and sends the data to satisfy the request, but client computer 610 does not make the request as expected.

The first situation is when the end user aborts retrieval of a Web page interactively with client application 611. In this case, client application 611 may never request the data referenced in the references embedded in received page. According to the HTTP protocol, an abort message is sent by client computer 610 to gateway computer 612 and this abort message is forwarded to remote communication server 626. Once the remote communication server receives the abort message, further referenced data for that page is not sent. Data already sent to the gateway computer is buffered at the gateway computer but not forwarded to the client computer. In order that the buffer at gateway computer 612 does not grow too large, oldest unretrieved data is discarded.

The second situation in which the requests are not made as expected for the embedded data is when the user "follows a link," that is, an end user requests yet another page, before the current page has been rendered and all embedded data has been received. In this case, no abort message is sent and all the data is prefetched. If the user returns to the original page, the embedded data will likely still be buffered on the gateway computer and the requests for that data can be satisfied without making another request of server computer 618.

Figure 9:
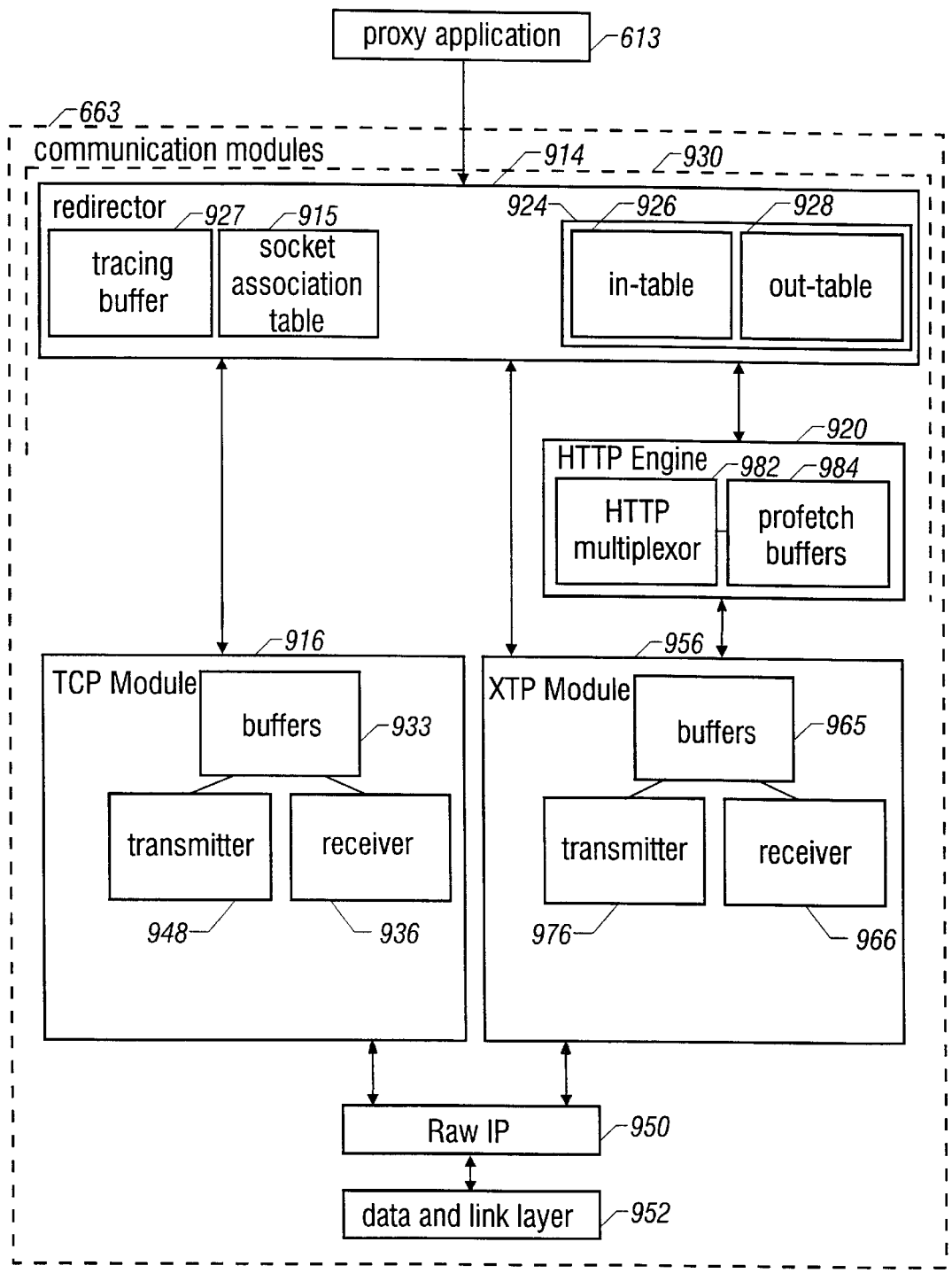
FIG. 9 shows an arrangement of software modules which execute on a gateway computer.

Referring to FIG. 9, proxy application 613 and communication modules 663 executing on gateway computer 612 implement the functionality of the gateway computer as described above. This first embodiment uses the Microsoft Windows 95 or Windows NT operating system on the gateway computer. A description of the software modules that implement the functionality of remote communication server 626 follows the description of gateway computer 612.

Proxy application 613 interacts with several software modules in order to communicate with client computer 610, server computer 618, and other server computers and remote communication servers. Proxy application 613 can be implemented in a variety of ways, including those used in a number of commercially available proxy application programs.

Proxy application 613 requests services from one or more communication software modules which implement different communication protocols. As normally configured in a typical installation of Windows 95 or Windows NT, TCP related requests from proxy application 613 would be passed directly to TCP module 916 which is provided by Microsoft. However, in this embodiment, a software interface module, a "hook," is installed such that all TCP related requests from any application, and in particular from proxy application 613, are passed to redirector 914. The redirector can pass these requests for TCP services to TCP module 916, to XTP module 956, or to HTTP Engine 920 which may request services from XTP module 956. TCP module 916 and XTP module 956 request services from Raw IP module 950 which in turn communicates with data and link layer module 952. Data and link layer module 952 is responsible for maintaining communication links with remote computers including client computer 610, server computer 618, and remote communication server 626.

Not shown in FIG. 9 are software interface modules on the paths used to pass communication requests from proxy application 613 to redirector 914, from redirector 914 to each of TCP module 916 and XTP module 956, and from HTTP Engine 920 to XTP module 956. These software interface modules accept requests according to the Windows Socket (Winsock) API as specified my Microsoft and pass the requests on to the respective modules. The software interface module on the path joining proxy application 613 and redirector 914 is implemented by the "hook" software interface module introduced above, and is configured to pass only TCP related requests from the proxy application to redirector 914. Requests by proxy application 613 for services involving other protocols than TCP are passed to other software modules which are not shown in the figure. The software interface module on the paths joining redirector 914 to TCP module 916 and to XTP module 956, as well as on the path joining HTTP Engine 920 to XTP module 956 use a Winsock2 module which is a dynamically linked library supplied by Microsoft. Winsock accepts requests according to the Winsock API and makes requests according to the Winsock Service Provider Interface (SPI).

Proxy application 613, as well as other modules using the Winsock API, request communication services in multistep sequences. These steps can include the following types of requests:

A. Request creation of a "socket" using a particular communication protocol, such as TCP or XTP. At any one time, this socket can be used for a single data stream. On successful completion of the request, a "handle" to the socket, an unsigned scalar index, is returned. Further requests related to this socket use the socket handle to identify the socket.

B. Request that an outbound communication channel be established to (connected to) a remote computer. For TCP/IP, the remote host address and port index are specified as the terminating end of the communication channel.

C. Request that an inbound communication channel be established (listened for and accepted) from a remote computer on a particular port. The port may be the port already used for an outbound channel established in a step B above, or may be explicitly specified.

D. Send data on the outbound communication channel.

E. Receive data from the inbound communication channel.

Proxy application 613 makes a series of these communication requests specifying TCP as the communication protocol to be used. These requests are passed to redirector 914. In particular, in order to accept a connection from client computer 610 and then open a connection to server computer 618 on behalf of the client computer, client application 613 executes a series of communication requests including:

1. Create a socket (A) for communicating with client computer 610 using TCP.

2. Listen for and accept an inbound communication channel (C) on a particular port known to the client computer.

3. Request that an outbound communication channels be open (B) to the client computer. The port index at the client computer is the source port of the inbound communication channel.

4. Receive data (E) from the client computer. This data includes the address of server computer 618 with whom the client computer requests to communicate.

5. Create a second socket (A) for communicating using TCP.

6. Connect to server computer 618 (B) using the second socket.

7. Send data (D) (a request) received from client computer 610 to server computer 618.

8. Listen for an inbound channel (C) from server computer 618 on the port used for the outbound communication with the server computer.

9. Receive data (E) using the second socket from the server computer.

10. Send the received data (D) using the first socket to client computer 610.

Proxy application 613 makes the same of Winsock API requests regardless of whether a server computer is at a specially configured server site or a normally configured server site. The proxy application is not aware at the point of making the request whether a communication path through a remote communication server can be established, nor is it aware after communication has been established whether a direct TCP connection has been made to a server computer or whether an XTP connection has been made to a remote communication server.

At the application layer, when client application 611 communicates with server application 619 using HTTP, client application 611 creates an outbound data stream and receives an inbound data stream according to the HTTP protocol. When client application 611 sends HTTP data to proxy application 613, the proxy application requests that the data be written to an open socket but does not otherwise interpret it. Proxy application 613 makes the same request to write HTTP data regardless of whether it is communicating with a specially configured server site or a normally configured server site. The proxy application is not aware whether the HTTP data will be sent to server computer 618 over a TCP connection, sent first to remote communication server 626 using the modified HTTP protocol and XTP protocol, or handled on the gateway computer without requiring communication with any other computer.

In the sequence of requests executed by proxy application 613 enumerated above, redirector 914 passes all the requests related to first socket, which is used to communicate with client computer 610, to TCP module 916. Communication between proxy application 613 and server application 619, hosted on server computer 618, over a direct path between gateway computer 612 and server computer 618 passes through redirector 914, TCP Module 916, and finally Raw IP module 950 and data and link layer module 952. Communication between proxy application 613 and a remote communication server passes through redirector 914, may pass through HTTP Engine 920, passes through XTP module 956, Raw IP module 950 and finally data and link layer module 952. XTP module 956 implements a similar level of functionality as TCP module 916 using XTP as the transport layer protocol rather than TCP. HTTP engine 920 interprets data streams passing through it and implements the client end of the modified HTTP protocol used on the communication segment between gateway computer 612 and remote communication server 626.

In order to determine whether an indirect communication path to a server computer can be established through a remote communication server, redirector 914 uses information obtained from central database 645 on directory server 640. This information is used to determine if a suitable remote communication server is available and if so, the address of that remote communication server.

Rather than accessing central database 645 whenever it needs to establish a communication path to a server application, redirector 914 maintains local tables 924 that reflect some of the information in central database 645. A first table, "in_table" 926, includes a subset of the entries in central database 645. If an entry is found in this table, the central database does not have to be queried since the information in central database 645 is available locally. A second table, "out_table" 928, includes addresses of server applications known to not have entries in central database 645. If a server application does not have an entry, that server application is accessed using a direct communication path between the gateway computer and a server computer. If a server address is found in out_table, there is no reason to query directory server 640 since it is known locally at gateway computer 612 that no entry will typically be found. These two tables are updated based on information in central database 645.

TCP module 916 receives calls from redirector 914 to open and communicate using the TCP protocols. TCP module 916 receives requests from redirector 914 using the Winsock SPI. When the TCP module 916 receives a request from redirector 914, the redirector is essentially transparent. A call to the TCP module is essentially identical to the call that would have occurred in a typical installation of Windows 95 or Windows NT in which all TCP requests are passed directly to the TCP module rather than to redirector 914.

TCP module 916 maintains socket data 931 which is used to store information about sockets it creates on behalf of applications such as proxy application 613. The socket data is used, for instance, to map a socket handle with an open data connection to a local port index and a remote host address and port index. In addition, TCP module 916 includes data buffers 933 for connected inbound and outbound channels, and receiver and transmitter modules 936, 948 used to implement the TCP protocol independently for each inbound or outbound connection. TCP module 916 communicates with Raw IP module 950, which implements the IP protocol layer, and which in turn communicates with a link and physical layer module 952. The link and physical layer modules is responsible for the communicating over the physical connections including those to client computer 610 and to router 615 at POP 614.

In addition to forwarding requests to TCP module 916, redirector 914 can also forward requests received from proxy application 613 to XTP module 956 and to HTTP Engine 920. Redirector 914 passes to XTP module 956 requests to open communication channels to and communicate with specially-configured server sites in the case that the data stream on that channel does not necessarily use the HTTP application layer protocol. Redirector 914 uses HTTP Engine 920 for HTTP based connections to specially configured server sites. Along with a TCP request, redirector 914 provides HTTP Engine 920 the TCP socket handle used by the client application and the address of a remote communication server that will receive the XTP communication.

XTP module 956 implements the XTP protocol. Logical data streams associated with XTP sockets are associated with XTP contexts. The logical structure of the XTP module is very similar to that of TCP module 916 except that all logical data streams to or from a particular host are multiplexed into a single data stream communicated using the XTP protocol whereas in the TCP module, each logical stream uses a separate instance of the TCP protocol. XTP module 956 includes data buffers 965 for connected inbound and outbound channels, and receiver and transmitter modules 966, 976 used to implement the XTP protocol for each multiplexed data stream to a remote computer. XTP module 956 communicates with Raw IP module 950, which implements the IP network protocol layer, and which in turn communicates with a link and physical layer module 952. The link and physical layer module is responsible for the communicating over the physical connections including those to client computer 610 and to router 615 at POP 614. XTP module 956 maintains socket data 957 which is used to store information related to sockets created by the XTP module. Communication for multiple sockets between gateway computer 612 and a remote computer is multiplexed and demultiplexed by receiver and transmitter modules 966, 976 in XTP module 956 into a single inbound and a single outbound data stream and uses a single instance of the XTP protocol for each such stream. Socket data 957 is used to associate a socket handle with the local and remote port indices, as well as a key associated with the data stream associated with the socket.

An XTP based communication path between gateway computer 612 and a remote communication server is maintained for a period of time after all contexts are closed. If the client application tries to open a new connection to the remote communication server during this period, the connection is open with very little overhead. The period of time the connection persists, the "keep-alive time," can be a fixed interval or can be determined adaptively based on past communication characteristics.

Redirector 914 can also send a request to HTTP Engine 920 if it determines that a TCP request received from proxy application 613 corresponds to HTTP-based communication to a specially-configured server site. HTTP Engine 920 interprets the application layer HTTP protocol used on a data connection. The HTTP Engine performs two functions in addition direct translation of TCP requests into XTP requests. First, the information in multiple HTTP data streams passing between the gateway computer and a particular remote communication server are multiplexed in HTTP multiplexor 982 for communicating using a single XTP context. Second, the HTTP Engine maintains prefetch buffers 984 which are used to service some HTTP requests for data. The HTTP multiplexor fills the prefetch buffers with data that has not yet been requested and provides the buffered data when a request can be satisfied with that data.

Redirector 914 maintains two additional data structures used in redirecting requests from proxy application 613 to the appropriate communication modules. When proxy application 613 requests creation of a TCP based socket, a TCP socket is indeed created for the proxy application and its handle is returned to the proxy application. At later point when proxy application 613 requests connection to a particular server computer, a second XTP based socket may be created at the request of redirector 914 if indirect communication with the server computer through a remote communication server is to be established. Redirector 914 maintains socket association table 915 which associates the TCP socket handle known to the proxy application and the XTP socket handle used for communicating with a remote communication server. Socket association table 915 also includes information needed to determine which communication module should handle requests for that socket.

Redirector 914 also includes a tracing buffer 927 used to record (trace) certain requests from proxy application 613 that are passed on to TCP module 916. In particular, after the proxy application requests creation of a TCP socket, other requests related to that socket may be made by the proxy application prior to receiving a request to listen for an inbound connection or to connect to a particular remote computer. It is not until a request to establish a connection is received by redirector 914 that a determination can be made that the communication should use XTP rather than TCP. Therefore, these initial TCP requests are recorded in tracing buffer 927. If redirector 914 determines that an XTP socket should be created and associated with a previously created TCP socket, the recorded requests related to the TCP socket are "replayed" to the XTP socket. In this way, the XTP socket will be initialized such that proxy application cannot recognize that further requests directed to the TCP socket are now redirected to the new XTP socket.

Figure 10:
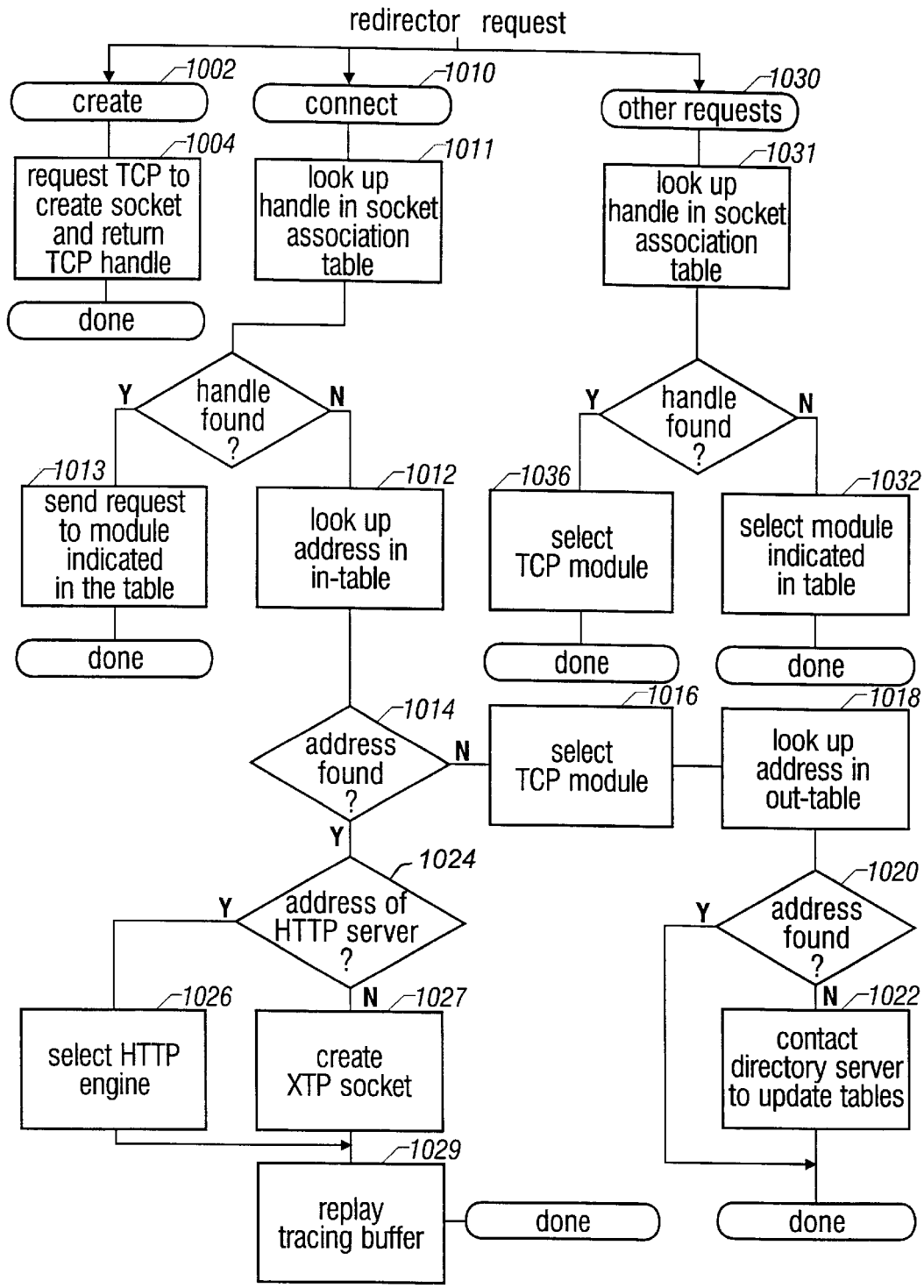
FIG. 10 is a flowchart of the operation of a redirector in response to requests from an application.
Figure 11:
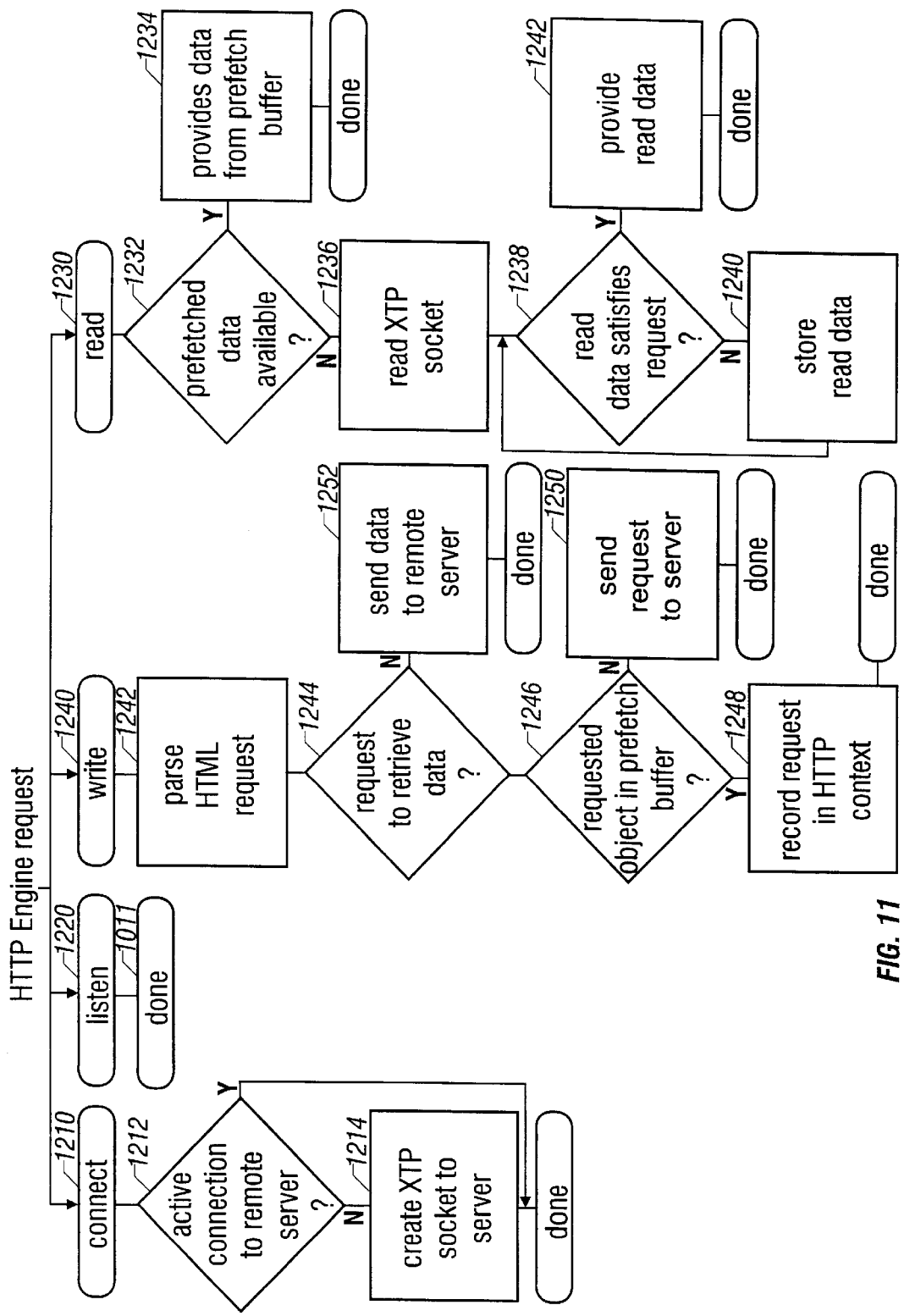
FIG. 11 is a flowchart of the operation of an HTTP Engine in response to requests from a redirector.

FIGS. 10 and 11 illustrate the detailed operation of redirector 914 and HTTP Engine 920. A detailed description of remote communication server 626 of this first embodiment follows the description of module operation in gateway computer 612.

Referring to FIG. 10, redirector 914 responds to a variety of requests proxy application 613. A request to create a TCP socket (1002) is passed to TCP module 916. A socket data handle is created by the TCP module and passed to the proxy application (step 1004).

If the request is to connect (that is, to open for writing) a TCP socket to a remote computer (1010), the redirector first looks up the TCP socket handle in socket association table 915 (step 1011). If an XTP socket handle is associated with the TCP socket handle, the request is passed to the software module handling communication for that TCP socket (step 1013). If the TCP socket handle is not listed in the socket association table, the redirector looks up the host address in in_table 926 (step 1012). The in_table contains the addresses of servers that are known to be served by remote communication servers. If the address is not found (step 1014), then the request is forwarded to the TCP module (step 1016). Separately, either during or some time after the call to the TCP module, the redirector looks up the address in out_table 928 (step 1018). If the address is found (step 1020), then the addressed host is known to not be served by a remote communication server and no more processing is performed. If the address is not found in either the in_table or the out_table, the redirector accesses directory server 640 to update in_table and out_table (step 1022). If the address was found in the in_table (step 1014), then a remote communication server is servicing requests for the addressed host. The next step is to determine whether the addressed port on the addressed host is associated with an HTTP server (step 1024). This information is also stored in in_table along with the remote communication server address. If the connect request is to an HTTP server, a request to create a socket is passed to HTTP Engine 920. The HTTP Engine obtains an XTP socket handle from XTP module 956 and returns the socket handle to redirector 914. The redirector records the socket handle in socket association table 915 with the TCP socket handle used for the request by the proxy application, along with an indication that HTTP Engine 920 is now handling requests for that TCP socket. If the addressed host is not an HTTP server, redirector 914 requests XTP module 956 to create a XTP socket (step 1027) and the TCP socket handle and the new XTP socket handle are recorded in socket association table 915. In the cases that a XTP socket is created by XTP module 956 or indirectly by HTTP Engine 920, requests recorded in tracing buffer 927 are replayed (step 1029) to the software module (XTP module 956 or HTTP Engine 920) now handling communication for the socket.

If the redirector receives a request other than one to create or connect a socket (1030) the redirector first looks up the TCP socket handle in socket association table 915 (step 1031). If an XTP socket handle is associated with the TCP socket handle, the request is passed to the software module handling communication for that TCP socket (step 1032) otherwise the request is sent to the TCP module (step 1034). Note that communication between proxy application 613 and client application 611 is established by the proxy application issuing a listen request using a TCP socket that the proxy application has associated with (bound to) a predefined port. This listen is passed to TCP module 916 according to step 1036.

Referring to FIG. 11, when HTTP Engine 920 receives a request to create an XTP socket to a remote communication server in order to service requests for a TCP socket to communicate with a server computer (step 1210), the HTTP Engine may use an already open XTP connection and multiplex communication for the TCP socket on the open connection. If there is no active XTP connection to the remote communication server (step 1212), HTTP Engine 920 requests creation of an XTP socket and connects to the remote communication server (step 1214). When the HTTP Engine receives a write request (step 1240), it parses the HTTP content of the request (step 1242). If the request is to retrieve a remote object from the server (step 1244), the HTTP Engine first checks to see if the object is already in prefetch buffers 984 (step 1246). If it is, the HTTP Engine records the association of the TCP socket handle and the object requested (step 1248) so that subsequent listen and read requests can retrieve the appropriate buffered data. If the object is not buffered, the request is forwarded over the multiplexed data stream to the remote communication server (step 1250). If the write was not a request for an object (step 1244) the data is sent to the remote communication server (step 1252). When the HTTP Engine receives a request to listen on a connection that previously was used to send or record a request (step 1220), no further processing is necessary. When the HTTP Engine receives a request to read (step 1230), the object previously requested is determined from HTTP context 986. If all or some of the object is in prefetch buffer 984, that data is provided in response to the read request (step 1234). If there is no more data in the prefetch buffer (step 1232), for example if the transfer of the object was initiated before the request from the client, but is still in progress, the HTTP engine requests data from the XTP module using the appropriate XTP socket handle (step 1236). If the received data is for another object (step 1238), that data is stored in prefetch buffer 984 (step 1240), and another XTP read is requested (step 1236). If the received data is for the requested object, the data provided in response to the read request (step 1242).

The description above has concentrated on the functionality at gateway computer 612. At the server site, remote communication server 626 forms the endpoint of XTP-based communication with the gateway computer. Referring again to FIG. 6, remote communication server 626 acts as a gateway between gateway computer 612 and servers 618, 620.

Figure 12:
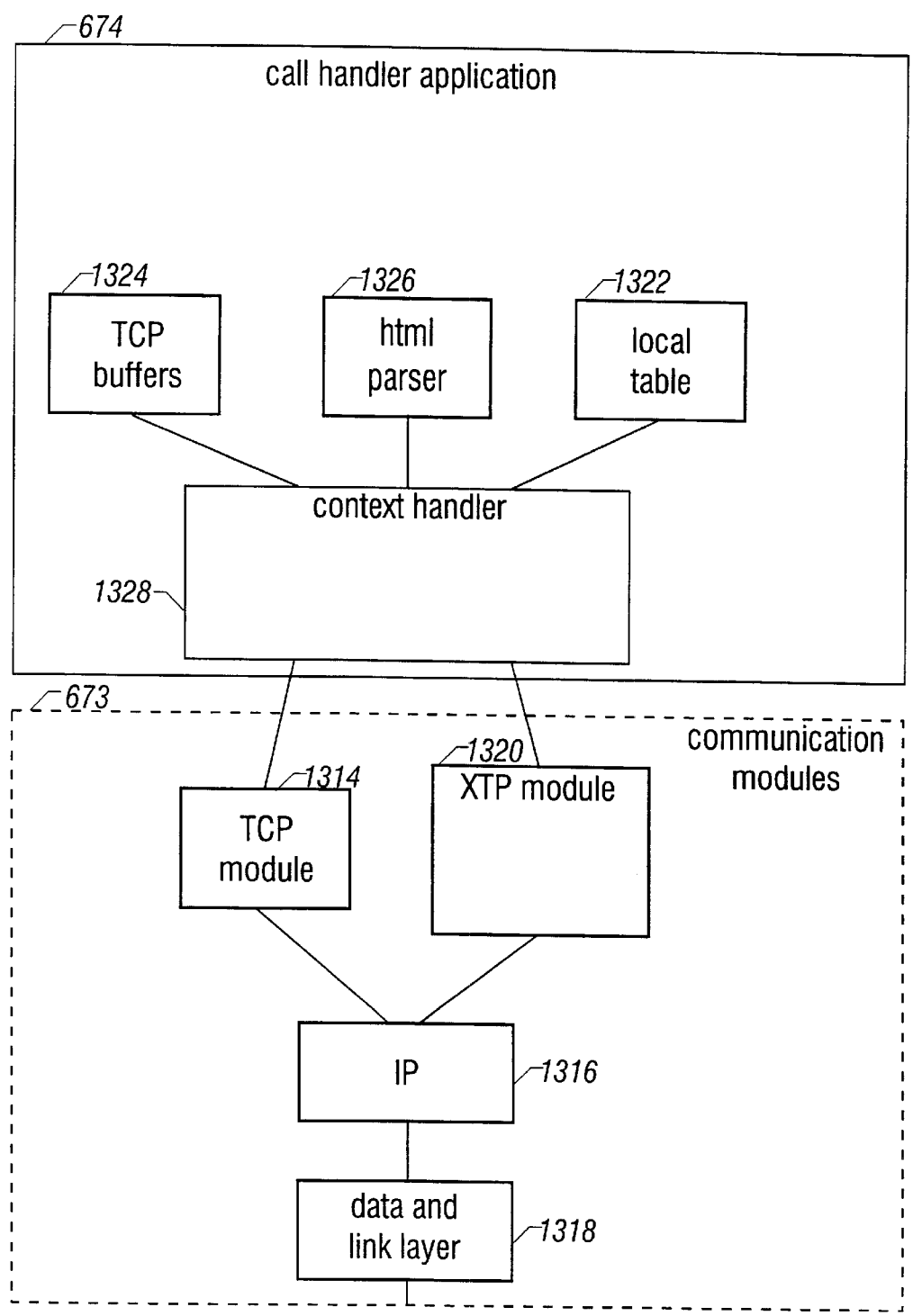
FIG. 12 shows an arrangement of software modules which execute on a remote communication server.

Referring to FIG. 12, call handler application 674 and communication modules 673 execute on a representative remote communication server 626. In the first embodiment, remote communication server 626 is a computer running a Windows NT or Unix based operating system. A standard TCP protocol stack including a TCP module 1314, an IP module 1316, and a link and data layer module 1318 are used to communicate to servers 618, 620. An XTP module 1320 communicates directly with the IP module. Call handler application 674 communicates with communication modules 673 to handle communication between a gateway computer and server computers. In addition, the HTTP object prefetching function is implemented in call handler application 674.

Call handler application 674 includes a context handler module 1328 which directs communication between gateway computers and server computers, html parser 1326 used to interpret html format data passing from a server computer to a gateway computer, local table 1322 which includes information about server computers served by the remote communication server, and TCP buffers 1324 used to hold data passing between server computers and gateway computers.

Context handler 1328 initially creates an XTP context and makes a listen request of the XTP module to accept a connection from a gateway computer. When a gateway computer connects an XTP context, context handler 1328 finds the destination TCP address for a server computer in a local table 1322 and initiates an execution thread to handle communication with that gateway computer and the server computer. There is typically one execution thread per XTP context. The execution thread opens a TCP channel to a server application. A context thread may open multiple concurrent TCP channels to one or more server computers to handle multiplexed requests from its corresponding gateway computer. When the context handler is notified that a listen on a port has been requested by the client, a TCP listen is requested through TCP module 1314 and begins to read data that it buffers in TCP buffer 1324.

Context handler 1328 is also responsible for the server end of the modified HTTP protocol. As a Web (html format) page is retrieved from a Web server by a context handler through the TCP/IP stack, the page is parsed by html parser 1326. References to objects are extracted. The context handler then makes requests for the objects on servers also served by the remote communication server and forwards the results to the gateway computer which stores them in its prefetch buffer anticipating a request for them from the client application.

Local table 1322 containing served hosts addresses is periodically communicated to a directory server 640 so that a gateway computer can locate an appropriate remote communication server for a TCP address.

A second embodiment of the invention implements the same functionality from the point of view of a client application or a server application as in the first embodiment. However, in the second embodiment, software modules are hosted directly on a client computer or a server computer. In addition, since a gateway computer is not used, no proxy application is needed. The arrangement of software modules on a client computer is substantially identical to that shown in FIG. 9 with the exception that proxy application 613 is replaced with a client application.

At the server site in the second embodiment, the functionality of the server computer and the remote communication server are combined on a single computer which uses the Microsoft Windows 95, Windows NT, or Unix operating system. A server application 1412 configured to use TCP and HTTP executes on the server computer.

Figure 13:
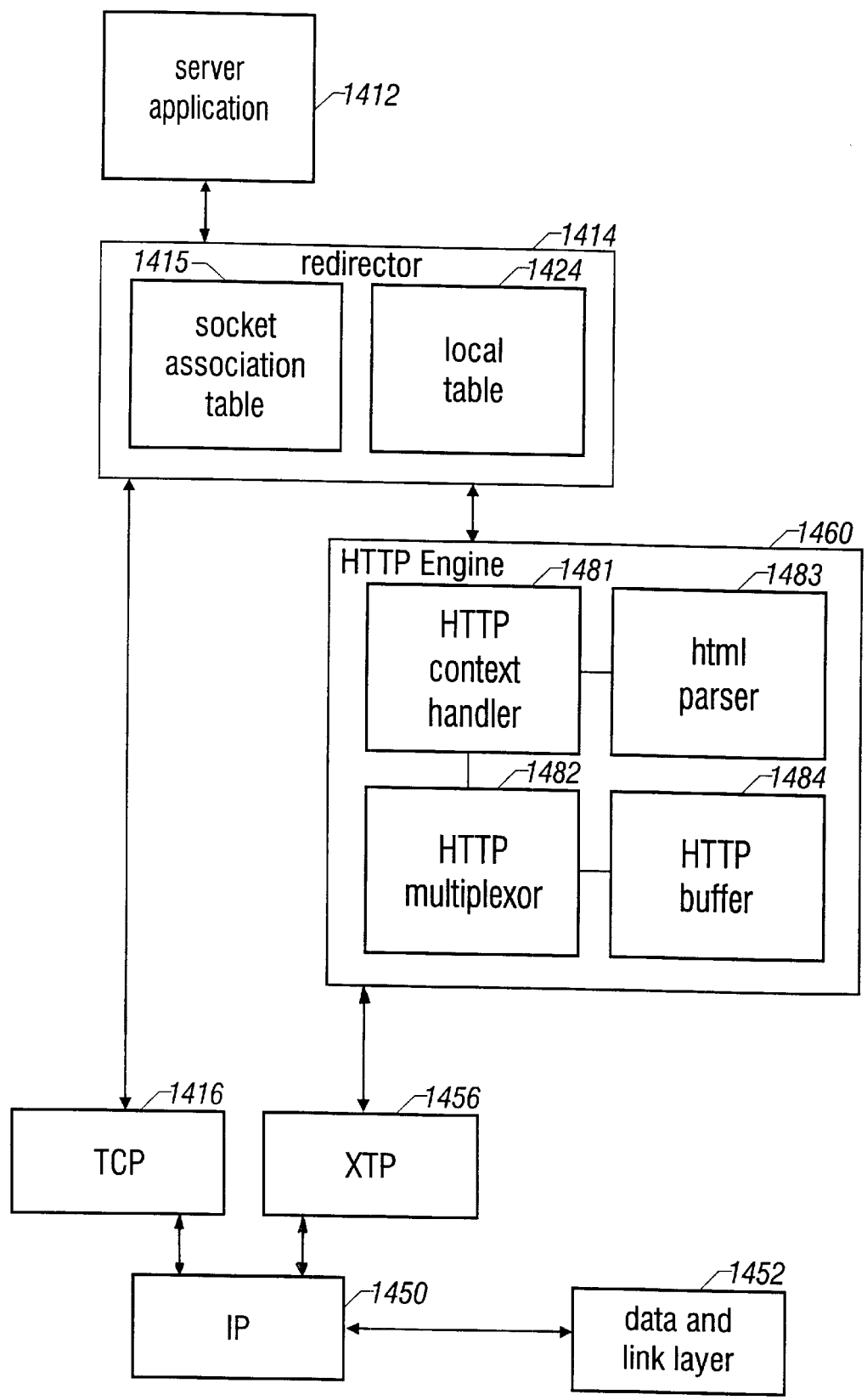
FIG. 13 shows an arrangement of software modules which execute on a server computer which supports communication using both TCP and XTP protocols.

Referring to FIG. 13, the arrangement of software modules is similar to that shown in FIG. 9. Server application 1412 requests TCP services from redirector 1414. Redirector 1414 communicates with TCP module 1416, XTP module 1456, or HTTP Engine 1460 to handle services requested by server application 1412. Redirector maintains a socket association table 1415 that associates TCP socket handles created for the server application and XTP sockets created by the redirector.

Redirector 1414 initially receives a request from server application 1412 to listen on a predefined port to a TCP connection from a client system. Redirector 1414 determines using local table 1424 whether that port corresponds to a server application for which an XTP-based connection can be accepted, and if so, it is a server port for HTTP based communication. Based on this determination, redirector 1414 either forwards a request to listen only TCP module 1416, or in addition requests either XTP module 1456 or HTTP Engine 1460 to also listen for an XTP based connection on an XTP socket. If a connection is received on an XTP-based socket, the association of the TCP socket handle known to the server application and the XTP socket handle known to the redirector is recorded in socket association table 1415.

When redirector 1414 receives any other request using a TCP socket handle, that handle is looked up in socket association table 1415 and if found, the request is forwarded to the module handling that socket (XTP module 1456 or HTTP Engine 1460), otherwise it is sent to TCP module 1416.

When HTTP Engine 1460 receives a request to send information to a client computer, HTTP Engine multiplexes the outbound data using HTTP multiplexor 1482. If the data stream corresponds to an html format Web page, the information in that page is interpreted in html parse 1483 and references to embedded data are recorded by HTTP context handler 1481. If the referenced data is available from server application 1412, HTTP context notes that this data should be prefetched from server application 1412.

When HTTP Engine 1460 receives a request to listen for a connection, that request can be satisfied in three different ways. First, if HTTP context handler 1481 has previously noted that data should be prefetched from server application 1412, a HTTP request is simulated by HTTP context handler 1481 and the listen is satisfied by this simulated request. Second, XTP module 1456 may accept a new XTP socket from a new client computer. Third, HTTP Multiplexor 1482 may satisfy the request using multiplexed communication on a XTP communication channel with a current client computer. HTTP Engine 1460 records the association of the TCP socket handle known to the server application and the source of the data that satisfied the listen request.

When HTTP Engine 1460 receives a request to read data, the read is either satisfied by HTTP context handler 1481 which simulates a HTTP request, or is handled by HTTP multiplexor 1482 depending on how the corresponding listen request was handled. Since multiple data streams may be multiplexed on a single XTP context, the read request handled by HTTP multiplexor 1482 is either satisfied by previously read data in HTTP buffer 1484, or by data read from an inbound XTP socket. Data read but that is not used to satisfy the read request is buffered in HTTP buffer 1484 until data that does satisfy the read request is found on the inbound stream.

Figure 1:
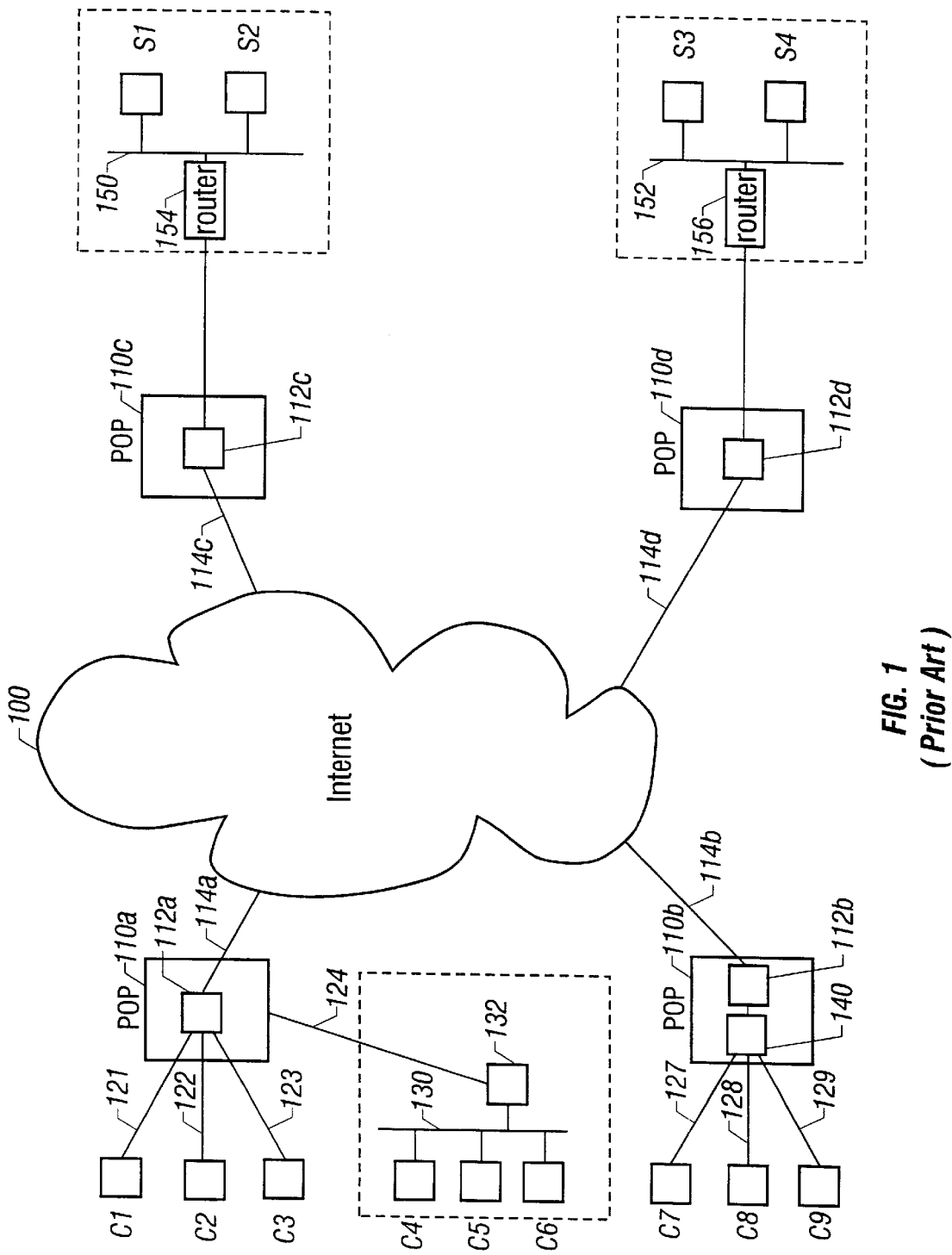
FIG. 1 illustrates typical coupling of client and server computers to the Internet.
Figure 2:
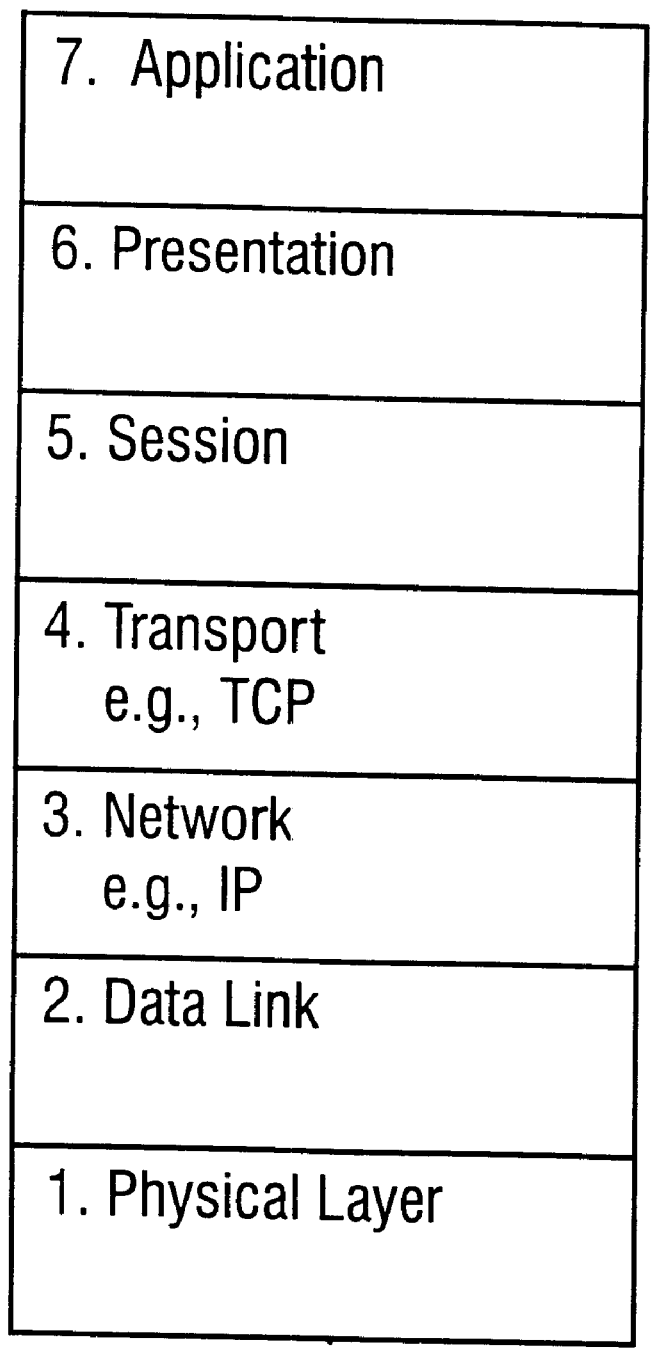
FIG. 2 shows the seven ISO communication protocol layers.

In other embodiments, a variety of client and server sites can be used. Some client sites can include clients communicating through a gateway computer while other clients communicate directly using XTP. Some server sites can use remote communication servers while others can use server computers that include the functionality of a remote communication server. In addition, the functionality hosted on a gateway computer in the first embodiment can be hosted on a proxy server at a POP such as proxy server 140 at POP 110*b* shown in FIG. 1. In addition, communication between a client computer and the proxy server can use a variety of protocols, including proprietary protocols that are particular to communication between certain clients and certain proxy servers.

Other embodiments of the invention can use an alternative method to determine whether a remote communication server is associated with a server computer rather than using the in_table and out_table in a redirector module or a central database on a directory server. One approach is for the address of the remote communication server to be a known transformation of the original TCP address, for example, a different port index on the same addressed host. In this approach, a gateway computer or a specially enabled client computer tries to make a connection to an remote communication server (which may not exist) and if there is no response, assume that the TCP address is not served by a remote communication server and, instead, proceed to establish a TCP connection.

In embodiments that use a directory server, there may be some remote communication servers that do not advertise their address in the directory server. For example, access to a particular remote communication server may be limited to particular subscribers of a service while others use the standard TCP interface. In such a case, there may be some other, possibly manual, method of adding a host to the in_table in a redirector module. Also, requests from an gateway computer may be batched and communication between an gateway computer and a directory server can occur less frequently thereby reducing the load on the directory server.

In other embodiments, multiple alternative protocols can be supported. Instead of passing all non-TCP communication through an XTP module, a matrix switch feeding multiple protocol modules can be used. The redirector then also determines which protocol module to use. Software modules, including the "hook," the redirector, or the HTTP Engine, may be incorporated into a layered Winsock protocol under the Windows 95 or Windows NT operating system.

Additional application protocol spoofing can be performed. For example, an FTP module can be inserted between a redirector and the XTP module to spoof FTP communication in the same way that a HTTP Engine is used to spoof the HTTP application protocol. Various techniques may be used to initialize a socket using an alternative protocol. Rather than recording requests in a tracing buffer, the socket may be initialized directly into a desired state.

In addition to adding alternative transport protocols which use IP, replacing the IP layer as well may be feasible in some situations. For example, if IP is layered on an ATM network, both TCP and IP can be bypassed in a similar arrangement to that used to bypass TCP in the described embodiments.

Embodiments of this invention can make use of multiple TCP segments rather than using XTP or some other alternative transport protocol. In such embodiments, application protocol spoofing, multiplexing, and server site aggregation (service of multiple server computers using a single remote communication server) can be used over TCP channels. In addition, the parameters of the TCP connections on different segments may be different resulting in improved end-to-end characteristics.

Other embodiments may address other channel characteristics than throughput and latency, or address throughput and latency using different types of communication techniques. For example, achieving low latency over high capacity but high delay channels may be best be achieved by using an alternative transport protocol that makes use of forward error correction rather than error detection and retransmission. In addition, the alternative protocols can be used to control a quality of service on certain data streams while still allowing the application to use TCP without modification.

Software used to implement various components of the invention may be stored on a variety of computer readable media, including fixed or removable magnetic or optical disks. Alternatively, it may be stored remotely from the computer on which the modules execute, and accessed using a data network.

Other embodiments which will become apparent are within the scope of the following claims.

What is claimed is:

1. A communication system for coupling to and enabling an application to communicate over a data network with a remote system, said communication system comprising:
   a first module which interfaces with the application, said first module including a protocol selector;
   a second module in communication with the first module, said second module implementing a communications protocol stack which enables the first module to communicate over the network with the remote system, said second module including a transport layer module implementing a plurality of selectable transport layer protocols for use in the communications protocol stack, wherein in response to the first module receiving a request to establish communication with the remote system using a first transport layer protocol, the protocol selector queries one or more sources of information about the remote system and based on results of that query selects one of the plurality of selectable transport layer protocols for establishing the requested communication with the remote system, wherein said selected transport layer protocol is a second transport layer protocol that is different from the first transport layer protocol if the query establishes that the remote system is accessible using the second transport layer protocol and even though the application is requesting to communicate with the remote system using the first transport layer protocol.

2. The communication system of claim 1 wherein said selected transport layer protocol is the first transport layer protocol if the query establishes that the remote system is not accessible using any of the other transport layer protocols among said plurality of selectable transport layer protocols.

3. The communication system of claim 1 wherein the second transport layer protocol supports selective retransmission, and the first transport layer protocol does not support selective retransmission.

4. The communication system of claim 1 wherein the second transport layer protocol supports transmission rate control, and the first transport layer protocol does not support transmission rate control.

5. The communication system of claim 1 further comprising a multiplexor which during use multiplexes information received from the application into a single outbound data stream for transmission to the remote system using the second transport layer protocol.

6. The communication system of claim 1 further comprising a prefetch buffer used to hold information received from the remote system prior to receiving a request for the information from the application.

7. The communication system of claim 6 further comprising:
   an interpreter which during operation parses and interprets a request for information from the application; and
   a means for determining if the requested information is stored in the prefetch buffer.

8. The communication system of claim 1 wherein the first transport layer protocol is TCP (Transmission Control Protocol).

9. The communication system of claim 1 wherein the second transport layer protocol is XTP (express Transport Protocol).

10. The communication system of claim 1 wherein the first transport layer protocol is TCP (Transmission Control Protocol) and the second transport layer protocol is XTP (express Transport Protocol).

11. The communication system of claim 1 wherein the first module comprises an in-table which is used to store the identity of a plurality of remote communication entities which are known to be accessible using the second transport layer protocol, and wherein the in-table is among the one or more sources of information which are queried by said protocol selector.

12. The communication system of claim 11 wherein the in-table stores an association between said plurality of remote communication entities which are known to be accessible using the second transport layer protocol and a second plurality of remote communication systems which are directly accessible using the second transport layer protocol and through which corresponding ones of said plurality of remote communication entities are accessible.

13. The communication system of claim 1 wherein the first module further comprises an out-table which is used to store the identity of a second plurality of remote servers which are known not to be accessible using the second transport layer protocol, and wherein the out-table is among the one or more sources of information which are queried by said protocol selector.

14. The communication system of claim 1 wherein the second module also implements a plurality of network layer protocols and wherein when the protocol selector selects one of the plurality of selectable transport layer protocols for establishing the requested communication with the remote system, it also selects a corresponding one of the plurality of network layer protocols, wherein not all of said plurality of transport layer protocols have the same network layer protocol corresponding thereto.

15. A method for communicating from an application to a remote system over a data network, said method comprising:
   receiving a request from the application to communicate with the remote system using a first transport layer protocol;
   querying one or more sources of information about the remote system, based on results of that query, selecting one of a plurality of selectable transport layer protocols for establishing the requested communication with the remote system, wherein said selected transport layer protocol is a second transport layer protocol that is different from the first transport layer protocol if the query establishes that the remote system is accessible using the second transport layer protocol and even though the application is requesting to communicate with the remote system using the first transport layer protocol; and
   communicating with the remote system over the data network using the second transport layer protocol.

16. The method of claim 15 wherein said selected transport layer protocol is the first transport layer protocol if the query establishes that the remote system is not accessible using any of the other transport layer protocols among said plurality of selectable transport layer protocols.

17. The method of claim 15 wherein the second transport layer protocol supports selective retransmission and the first transport layer protocol does not support selective retransmission.

18. The method of claim 15 wherein the selected communication protocol supports transmission rate control and the first transport layer protocol does not support transmission rate control.

19. The method of claim 15 further comprising multiplexing information received from the application into a single outbound data stream for transmission to the remote system using the second transport layer protocol.

20. The method of claim 15 further comprising:
   prefetching information from the remote system prior to receiving a request for that information from the application; and
   storing the prefetched information in a buffer.

21. The method of claim 20 further comprising:
   determining if a subsequent request from the application for information from the remote system can be satisfied through prefetched data in the buffer; and
   if it is determined that said subsequent request for information from the remote system can be satisfied through prefetched data in the buffer, retrieving relevant data from the buffer and sending it to the application.

22. The method of claim 15 wherein the first transport layer protocol is TCP (Transmission Control Protocol).

23. The method of claim 15 wherein the second transport layer protocol is XTP (express Transport Protocol).

24. The method of claim 15 wherein the first transport layer protocol is TCP (Transmission Control Protocol) and the second transport layer protocol is XTP (express Transport Protocol).

25. The method of claim 15 further comprising maintaining an in-table storing the identity of a first plurality of remote communicatioin entities which are known to be accessible using the second transport layer protocol, and wherein the step of querying one or more sources of information involves querying said in-table.

26. The method of claim 25 further comprising storing in said in-table an association between said plurality of remote communication entities which are known to be accessible using the second transport layer protocol and a second plurality of remote communication systems which are directly accessible using the second transport layer protocol and through which corresponding ones of said plurality of remote communication entities are accessible.

27. The method of claim 15 further comprising maintaining an out-table which is used to store the identity of a second plurality of remote servers which are known not to be accessible using the second transport layer protocol, and wherein the step of querying one or more sources of information involves querying said out-table.

28. Software stored on a computer-readable medium, said software comprising instructions for causing a computer to perform the functions of:
   receiving a request from the application to communicate with the remote system using a first transport layer protocol;
   querying one or more sources of information about the remote system;
   based on results of that query, selecting one of a plurality of selectable transport layer protocols for establishing the requested communication with the remote system, wherein said selected transport layer protocol is a second transport layer protocol that is different from the first transport layer protocol if the query establishes that the remote system is accessible using the second transport layer protocol and even though the application is requesting to communicate with the remote system using the first transport layer protocol; and
   communicating with the remote system over the data network using the second transport layer protocol.

29. The software of claim 28 wherein said selected transport layer protocol is the first transport layer protocol if the query establishes that the remote system is not accessible using any of the other transport layer protocols among said plurality of selectable transport layer protocols.

30. The software of claim 27 wherein the second transport layer protocol supports selective retransmission and the first transport layer protocol does not support selective retransmission.

31. The software of claim 27 wherein the selected communication protocol supports transmission rate control and the first transport layer protocol does not support transmission rate control.

32. The software of claim 27 wherein said instructions further cause the computer to perform the functions of multiplexing information received from the application into a single outbound data stream for transmission to the remote system using the second transport layer protocol.

33. The software of claim 27 wherein said instructions further cause the computer to perform the functions of:
prefetching information from the remote system prior to receiving a request for that information from the application; and
storing the prefetched information in a buffer.

34. The software of claim 27 wherein said instructions further cause the computer to perform the functions of:
determining if a subsequent request from the application for information from the remote system can be satisfied through prefetched data in the buffer; and
if it is determined that said subsequent request for information from the remote system can be satisfied through prefetched data in the buffer, retrieving relevant data from the buffer and sending it to the application.

35. The software of claim 28 wherein the first transport layer protocol is TCP (Transmission Control Protocol).

36. The software of claim 28 wherein the second transport layer protocol is XTP (express Transport Protocol).

37. The software of claim 28 wherein the first transport layer protocol is TCP (Transmission Control Protocol) and the second transport layer protocol is XTP (express Transport Protocol).

38. The software of claim 28 wherein said instructions further cause the computer to perform the functions of:
maintaining an in-table storing the identity of a first plurality of remote communication entities which are known to be accessible using the second transport layer protocol, and wherein the function of querying one or more sources of information involves querying said in-table.

39. The software of claim 38 wherein said instructions further cause the computer to perform the functions of storing in said in-table an association between said plurality of remote communication entities which are known to be accessible using the second transport layer protocol and a second plurality of remote communication systems which are directly accessible using the second transport layer protocol and through which corresponding ones of said plurality of remote communication entities are accessible.

40. The software of claim 28 wherein said instructions further cause the computer to perform the functions of:
maintaining an out-table which is used to store the identity of a second plurality of remote servers which are known not to be accessible using the second transport layer protocol, and wherein the function of querying one or more sources of information involves querying said out-table.

41. A server communication system for enabling a client communication system to couple over a data communication network to a one or more server applications, the server communication system comprising:
a transport layer module which during operation implements a plurality of transport layer protocols for communicating with the client communication system and the one or more server applications; and
a call handler module coupled to the transport layer module and configured (1) to establish a first transport layer communication stream between the sever communication system and the client communication system using a first one of said plurality of transport layer protocols, (2) to accept requests over the first communication stream from client communication system to communicate with a specified one of said one or more server applications, (3) to establish a second transport layer communication stream between the sever communication system and the specified server application using a second one of said plurality of transport layer protocols, and (4) to pass information between the client communication system and the specified server application over the first and second transport layer communication streams, wherein said first and second transport layer protocols are different and said first and second transport layer communication streams exist concurrently.

42. The server communication system of claim 41 further comprising a communication server computer which couples to the data communication network and is programmed to implement the transport layer module and the call handler module.

43. The server communication system of claim 42 wherein the communication server computer is further programmed to implement at least one of said one or more server applications.

44. The server communication system of claim 42 further comprising an application server computer programmed to implement at least one of said one or more server applications and a local data network coupling the communication server computer and the application server computer.

45. The server communication system of claim 42 wherein the first transport layer protocol supports selective retransmission and the second transport layer protocol does not support selective retransmission.

46. The server communication system of claim 42 wherein the first transport layer protocol supports transmission rate control, and the second transport layer protocol does not support transmission rate control.

47. The server communication system of claim 42 wherein the second transport layer protocol is TCP (Transmission Control Protocol).

48. The server communication system of claim 42 wherein the first transport layer protocol is XTP (express Transport Protocol).

49. The server communication system of claim 42 wherein the second transport layer protocol is TCP (Transmission Control Protocol) and the first transport layer protocol is XTP (express Transport Protocol).

50. The server communication system of claim 41 wherein the call handler nodule module further comprises a prefetch module which during operation parses information received from the specified server application for forwarding to the client communication system and automatically prefetches from the specified server application objects that are referenced in the parsed information.

* * * * *